US008814337B2

(12) United States Patent
Szajewski et al.

(10) Patent No.: US 8,814,337 B2
(45) Date of Patent: Aug. 26, 2014

(54) INKJET INK SETS FOR HIGH SPEED PRINTING ON PLAIN PAPERS AND GLOSSY MEDIA

(75) Inventors: Richard P. Szajewski, Rochester, NY (US); David T. Southby, Rochester, NY (US); David S. Uerz, Ontario, NY (US)

(73) Assignee: Eastman Kodak Company, Rochester, NY (US)

( * ) Notice: Subject to any disclaimer, the term of this patent is extended or adjusted under 35 U.S.C. 154(b) by 1686 days.

(21) Appl. No.: 11/964,846

(22) Filed: Dec. 27, 2007

(65) Prior Publication Data
US 2009/0169761 A1 Jul. 2, 2009

(51) Int. Cl.
*B41J 2/01* (2006.01)
*C09D 11/00* (2014.01)

(52) U.S. Cl.
CPC .............. *C09D 11/40* (2013.01); *C09D 11/326* (2013.01)
USPC ........................................................ 347/100

(58) Field of Classification Search
USPC ........................................................ 347/100
See application file for complete search history.

(56) References Cited

U.S. PATENT DOCUMENTS

| 5,985,017 | A | * | 11/1999 | Bugner et al. | ............. 106/31.75 |
| 6,440,203 | B2 | | 8/2002 | Kato | |
| 6,530,656 | B1 | | 3/2003 | Teraoka et al. | |
| 6,536,891 | B2 | | 3/2003 | Oyanagi | |
| 6,695,443 | B2 | | 2/2004 | Arita et al. | |
| 6,719,420 | B2 | | 4/2004 | Tomioka et al. | |
| 6,790,878 | B2 | | 9/2004 | Kurabayashi | |
| 6,846,302 | B2 | | 1/2005 | Shemesh et al. | |
| 6,864,302 | B2 | | 3/2005 | Miyabayashi | |
| 6,890,378 | B2 | | 5/2005 | Yatake et al. | |
| 7,030,172 | B2 | | 4/2006 | Sakurai | |
| 7,030,174 | B2 | | 4/2006 | Yatake | |
| 7,037,362 | B2 | | 5/2006 | Honma et al. | |
| 7,074,843 | B2 | | 7/2006 | Nakamura et al. | |
| 7,090,813 | B2 | | 8/2006 | Kuwata | |
| 7,094,813 | B2 | | 8/2006 | Namba et al. | |
| 2003/0076394 | A1 | * | 4/2003 | Gotoh et al. | ................... 347/100 |
| 2003/0226473 | A1 | * | 12/2003 | Ishimoto | ...................... 106/31.6 |
| 2004/0061754 | A1 | * | 4/2004 | Chen et al. | .................... 347/100 |
| 2004/0069183 | A1 | | 4/2004 | Kamoto et al. | |
| 2004/0099182 | A1 | | 5/2004 | Kamoto et al. | |
| 2005/0075449 | A1 | | 4/2005 | Kubota | |
| 2005/0284329 | A1 | | 12/2005 | Jackson et al. | |
| 2006/0238588 | A1 | | 10/2006 | Lee et al. | |
| 2007/0022902 | A1 | | 2/2007 | Koga | |
| 2007/0120928 | A1 | | 5/2007 | Ma et al. | |
| 2007/0139501 | A1 | | 6/2007 | Sekiguchi | |

FOREIGN PATENT DOCUMENTS

| EP | 1 457 535 | 9/2004 |
| EP | 1 473 338 | 11/2004 |
| EP | 1 849 840 | 10/2007 |

OTHER PUBLICATIONS

Edward W. Washburn; The Physical Review; "The Dynamics of Capillary Flow"; Second Series; Mar. 1921; vol. XVII; No. 3; pp. 273-283.
James W. Blease et al; U.S. Appl. No. 60/892,176, filed Feb. 28, 2007; titled "Ink Jet Ink for High Image Quality on Photoglossy Paper and Plain Paper".

* cited by examiner

*Primary Examiner* — Laura Martin
(74) *Attorney, Agent, or Firm* — Andrew J. Anderson

(57) ABSTRACT

An inkjet ink set including a cyan ink, a magenta ink and a yellow ink, wherein each of said cyan, magenta and yellow inks individually comprises at least 65% water, between 1% and 5% by weight of a dispersed pigment colorant, a surfactant that reduces static surface tension, a dynamic surface tension reducing agent distinct from the surfactant, and at least one humectant distinct from the surfactant and the dynamic surface tension reducing agent; and wherein each of said cyan, magenta and yellow inks is characterized by exhibiting a viscosity normalized dynamic surface tension at surface refresh ages of 0.01 s of less than 23.0 mN/(m*cP); and wherein the average viscosity normalized dynamic surface tension at a surface refresh age of 0.01 s for said cyan, magenta and yellow inks taken together is less than 22.0 mN/(m*cP).

19 Claims, No Drawings

INKJET INK SETS FOR HIGH SPEED PRINTING ON PLAIN PAPERS AND GLOSSY MEDIA

FIELD OF THE INVENTION

This invention relates to inkjet ink sets formulated to provide excellent images when applied to either plain papers or glossy media.

BACKGROUND OF THE INVENTION

Inkjet printing is a non-impact method for producing printed images by the deposition of ink droplets in a pixel-by-pixel manner to an image-recording element in response to digital data signals. There are various methods that may be utilized to control the deposition of ink droplets on the image-recording element to yield the desired printed image. In one process, known as drop-on-demand inkjet, individual ink droplets are projected as needed onto the image-recording element to form the desired printed image. Common methods of controlling the projection of ink droplets in drop-on-demand printing include piezoelectric transducers and thermal bubble formation. In another process, known as continuous inkjet, a continuous stream of droplets is charged and deflected in an image-wise manner onto the surface of the image-recording element, while un-imaged droplets are caught and returned to an ink sump. Inkjet printers have found broad applications across markets ranging from desktop document and photographic-quality imaging, to short run printing and industrial labeling.

Early inkjet inks were formulated much like conventional printing or pen applied inks. As greater attention has been directed towards printing speed, ease of use, reliability, and environmental issues, and with increasing interest in forming improved images, inks have been formulated to work well on specific media. One challenge is to obtain the highest possible image quality on a variety of inkjet receivers. Typically the receivers are categorized as a photoglossy or plain paper receiver. The two types of receivers are distinguished from one another in that the photoglossy receiver is manufactured with a coated layer above the underlying paper support. Photoglossy receivers may be further categorized as having a swellable polymer coating (non-porous media) or a microporous (hydrophilic particles in binder) media, although hybrid designs are also well known. Typical polymer coated media are capable of very high gloss in excess of 60 gloss units at a viewing angle of 60 degrees. Typical microporous media can be designed to have gloss values approaching those of some polymer coated media. The design of both plain paper and photoglossy media vary widely depending on materials and paper manufacturing processes, which should not be construed to limit the scope of the present invention.

For example, inks intended to provide durable and glossy images on photo-glossy image receivers can incorporate film forming polymers and soluble dye colorants while inks intended to provide well adhering fast drying, smooth images on plain papers can include soluble dye colorants, paper penetrants and paper anti-curl agents. The soluble dye inks all suffer from light fade, a problem which is especially significant when archival photo-images are desired and from poor resistance to rewetting. It has been proposed to alleviate the light fade problem by providing dispersed pigment as colorants in place of soluble dyes. However, use of pigments often leads to a reduction in image gloss and poor rub resistance on photo-glossy media and image inhomogeneity or mottle on plain papers. This inherent mottle or graininess problem which arises when applying pigmented inks to plain papers is generally not an issue when applying dye based inks to the same papers because of the fully soluble nature of the dyes and the more even colorant deposits that arise from them.

Representative disclosures of inkjet inks and printing methods said to provide improved images on glossy or coated papers include: Yatake et al., U.S. Pat. No. 7,030,174, Kurabayashi, U.S. Pat. No. 6,790,878B2, while representative disclosures of inkjet inks and printing methods said to provide improved images on plain papers include: Namba, et al., U.S. Pat. No. 7,094,813, Nakamura et al., U.S. Pat. No. 7,074,843B2, Aritu et al., U.S. Pat. No. 6,695,443B2, Teraoka, et al., U.S. Pat. No. 6,530,656B2, and Kato, U.S. Pat. No. 6,440,203B2.

Disclosures of inkjet inks and printing methods recommended to provide improved images on both glossy papers and economical plain papers include Yatake et al., U.S. Pat. No. 6,890,378B2 which describes the use of specific classes of acetylenic surfactants to provide reduced intercolor bleed properties, and Miyabayashi et al., U.S. Pat. No. 6,864,302 and Tomioka et al., U.S. Pat. No. 6,719,420B2, both of which describe the practice of mixing distinct inks having disparate charge characteristics at the recording material surface. The first suggestion suffers in that it promises to improve only a limited number of the known deficiencies while the second two lead to significant problems in inkjet engine maintenance as the inks can conglomerate in the inkjet apparatus during use.

Oyanagi, U.S. Pat. No. 6,536,891B2 describes control of Yellow to Black (Y v K) intercolor bleed on plain papers imaged by piezo jetting by providing inkjet ink sets with specified relationships between the static surface tensions of light (yellow) and dark (black) high viscosity inks. The high ink viscosity can both limit the jet firing frequency and lead to coalescence when the inks are applied quickly, especially to glossy media. Further no inkjet ink sets having cyan, magenta and yellow inks are disclosed in this publication. Kamoto, et al., US Pub. App. 2004/0069183A1 describes high viscosity inkjet inks with a difference of less than 7 mN/m between the static and dynamic surface tension at surface refresh rates of 0.5 to 35 Hz (i.e. surface ages of 2 s to ~30 ms) relative to the static surface tension of the same ink as providing inks with desired discharge stability from a piezo inkjet ink application system and a high quality recorded image. Again, high ink viscosity can both limit the jet firing frequency and lead to coalescence when the inks are applied quickly, especially to glossy media. Further, no explanation is given in this publication of bow to derive the single quoted value for dynamic surface tension over the stated surface refresh ages from the range of distinct values which inherently follow from use of a dynamic surface tension agent in an ink and are inherently reported at these distinct ink surface ages when using a bubble tensiometer.

Homna, et al., U.S. Pat. No. 7,037,362B2 describes dye based colored inks and pigment based black inks, characterized in having only limited viscosity after evaporation and a specified relationship between the dynamic surface tension of the same ink at surface ages of 10 ms and 1 s, that are said to provide quick drying and limited image bleeding on plain papers. Here, the use of dye based inks inherently leads to image instability on storage. Further, the utility of the approach is limited to dye based inks since pigment based inks set-up under the test conditions and inherently exhibit very high dry down viscosities. Further, no color inkjet ink sets with cyan, magenta and colorant inks are disclosed in this publication.

Koga, US Pub. App. 2007/0022902A1 describes high viscosity high dynamic surface tension dye based inks having reduced intercolor bleed on plain papers, and characterized by exhibiting a specified relationship within the ink set between the variously colored ink dynamic surface tensions at surface ages of 30 ms and 1 s. Here, the use of dye based inks inherently leads to image instability on storage. Further, since this publication discussed only dye colorant inks, it provides no teaching relative to the use of pigment colorant inks with respect to plain paper graininess. Ma, et al., US Pub App. 2007/0120928A1 describes inkjet inks having reduced intercolor bleed on glossy photo papers, and characterized by exhibiting a specified relationship within the ink set between the variously colored ink dynamic surface tensions. Specific ink components, formulations and ink physical properties beyond surfactant identity and levels are not disclosed. Further only black and yellow inks are described and no color inkjet ink sets having cyan, magenta and yellow inks are disclosed. Sekiguchi, US Pub. App. 2007/0139501A1 describes yellow and black dye based inkjet inks, suitable for use in thermal inkjet printers, the inks said to exhibit high density and reduced intercolor bleed (Yellow v Black) on plain papers when formulated based on the dynamic surface tension relationships of related model inks with no colorant added. The relationship between the actual ink properties and their performance is not disclosed. Here again, the use of dye based inks inherently leads to image instability on storage. Further only black and yellow inks are described and no color inkjet ink sets having cyan, magenta and yellow inks are disclosed.

Thus, none of this art provides inkjet inks, inkjet ink sets or inkjet printing methods which can provide high gloss archival images on micro-porous photo-glossy or coated papers, while simultaneously providing low noise images on economical plain papers. This has led to a situation where end users remain faced with the need to choose either between inkjet printer systems designed to produce photo-glossy images or inkjet printer systems designed for plain paper output. Thus, there is an unmet need for inkjet inks, inkjet ink sets, and inkjet printing systems which can provide excellent images when used with both photo-glossy coated papers and economical plain papers.

Ongoing theoretical and practical studies of the dynamics of the movement of water or oils through soils and the impregnation of woods and other porous materials with liquids led toward Washburn's seminal theoretical description of the physics and dynamics of capillary flow at Washburn, E. W. *The Physical Review*, Vol. XVII, No. 3, pages 273-283 (1921). Here, Washburn disclosed that the rate of fluid flow into a capillary was proportional to the fluid surface tension and inversely proportional to the fluid viscosity under conditions where the fluid wets the capillary surface. Washburn draws a parallel between the rate of single capillary flow and the overall rate of fluid uptake that might be encountered during the wetting of porous bodies. The import of this work is intuitively in that increasing viscosity tends to retard the flow of fluid into porous material while decreasing fluid surface tension retards flow and mixing of fluids with hydrophilic surfaces, such as the aforesaid mentioned soil and wood. This work considers equilibrium processes and bulk flows over long times and does not consider fluids whose surface tension might vary with the age of the fluid surface.

Typically, molecularly homogeneous fluids exhibit surface tensions that do not vary with the age of the fluid surface. It is only with molecularly heterogeneous bulk fluids, i.e. mixed ingredient solutions, that changes in surface tension with surface age occur and only when these heterogeneities involve the segregation of particular molecular species between the fluid bulk and the fluid surface. A most relevant occurrence of this phenomenon occurs with fluids that are aqueous solutions of water soluble organic materials where the water soluble organic materials are distinguished by having rod-like structures with hydrophobic and hydrophilic ends. At equilibrium, hydrogen bonding forces between water molecules tend to exclude the hydrophobic ends of the rod-like structures from the bulk with the result that the overall fluid is heterogeneous with the organic materials concentrated at the fluid surface and with hydrophobic ends of the organic materials aligned away from the bulk. As a result the fluid exhibits a lowered surface tension more characteristic of organic fluids than aqueous fluids. It is precisely because of these surface altering properties that rod-like organic material with hydrophilic and hydrophobic ends are referred to as surfactants.

When a bulk fluid, such as an inkjet ink, having an incorporated surfactant is fired by an ink-ejector as an ink droplet, the droplet initially can be in a non-equilibrium condition as far as distribution of the surfactant between bulk and surface are concerned. The distinction between bulk and surface properties only being re-established as surfactant molecules accumulate at the freshly formed ink-drop surface under the impulse of random molecular migration. This random molecular migration, often quantified as a molecular diffusion coefficient, is in turn influenced inter alia by the size of the diffusing molecule, which usually follows the molecular weight, and by the viscosity of the bulk fluid. As any particular ink drop impacts a recording medium, the surface and bulk of the drop are mechanically mixed and the equilibrium properties of the ink become less relevant to its physical interaction with the medium.

SUMMARY OF THE INVENTION

It is an object of the invention to provide inkjet ink sets and inkjet printing methods which can provide high image quality, high gloss, low haze, low intercolor bleed images on micro-porous photo-glossy and coated papers while simultaneously providing low noise images on economical plain papers. It is a further object of this invention to provide storage stable inkjet inks having especially fine sized pigment particles which form images having excellent light and dark stability, high density, high gloss, and low mottle on a variety of printing surfaces.

Through careful study and observation, the inventors have now discovered that these aims can be achieved by providing aqueous inkjet ink sets where each of the cyan, magenta and yellow inkjet inks in the set are both pigmented inks and exhibit a viscosity normalized 0.01 s surface age surface tension within a defined range. In particular, the objectives of the invention are attained by providing an inkjet ink set comprising a cyan ink, a magenta ink and a yellow ink, wherein each of said cyan, magenta and yellow inks individually comprises at least 65% water, between 1% and 5% by weight of a dispersed pigment colorant, a surfactant that reduces static surface tension, a dynamic surface tension reducing agent distinct from the surfactant, and at least one humectant distinct from the surfactant and the dynamic surface tension reducing agent; wherein said surfactant, said dynamic surface tension reducing agent and said humectant can be the same or different between said cyan, magenta and yellow inks; and wherein each of said cyan, magenta and yellow inks is characterized by exhibiting a viscosity normalized dynamic surface tension at surface refresh ages of 0.01 s of less than 23.0 mN/(m*cP); and wherein the average viscosity normalized dynamic surface tension at a surface refresh age of 0.01 s for said cyan, magenta and yellow inks taken together is less than 22.0 mN/(m*cP).

Through their assiduous efforts, the inventors have discovered that the aforementioned objectives can be met by balancing the dynamic surface tensions of all three colored inks over the time frames peculiarly relevant for liquid absorption on both plain papers and glossy media (i.e. at ink surface ages of 0.01 s) against the ink viscosities. Without necessarily being bound by any particular mechanistic interpretation, it appears to the inventors that the objective of low plain paper image inhomogeneity or graininess and low intercolor bleed is best attained by retaining ink fluids at the paper surface long enough to allow some water evaporation and cause pigmented colorant to accumulate and coagulate at the plain paper surface instead of flowing into the voids inherent in plain papers. In a similar vein, high gloss images on porous media are likewise achieved by retaining inks at the medium's surface long enough to evaporate water and allow inks to spread along the surface without mixing. Higher surface tensions at short surface refresh ages do not provide the desired image effects, because these high surface tensions promote fluid absorption in preference to water evaporation while lower surface tensions at short surface refresh ages do not allow reliable high speed ink ejection. Low ink viscosity promotes excessive ink flow into plain paper cavities or voids in a micro porous medium and does not promote improved image properties that arise form controlled and homogeneous drying. Conversely high ink viscosity impairs high speed firing, promotes pen clogging and the accumulation with mixing of ink constituents on a medium's surface (coalescence). Accordingly, ink surface tensions and viscosities need to be jointly balanced to achieve the desired results. The proper balance is best defined by the recited viscosity normalized 0.01 s surface tension ranges. All three of the cyan, magenta and yellow inks should be in the stated ranges so that both primary and secondary colors achieve uniform benefits on both plain and glossy media.

Here $\sigma_{0.01s}$ represents the surface tension at a surface age of 0.01 s, $\eta$ represents the fluid viscosity, and the ratio ($\sigma_{0.01s}/\eta$) represents the viscosity normalized 0.01 s surface tension. This value is reported in units of milliNewtons per meter*centipoises, or mN/(m*cP).

In a preferred embodiment at lease one of said inks comprises a pigment colorant having a volume weighed $50^{th}$ percentile particle size of between 1 and 85 nm. It is more preferred that all three of said cyan, magenta and yellow pigment colorants have a volume weighed $50^{th}$ percentile particle size of between 1 and 85 nm. The dispersed pigment colorant can be a surfactant-dispersed pigment, self-dispersed pigment colorant, or a polymeric-dispersed pigment colorant. When the colorant is a surfactant-dispersed pigment colorant, the surfactant dispersant is preferably a metal salt of oleylmethyltaurate. In further preferred embodiments, each of the cyan, magenta and yellow inks further comprises a polyurethane polymer binder, and at least one of said inks further comprises a benzylmethacrylate-methacrylic acid copolymer.

While any agent that serves to control the surface tension at 0.01 s surface age can be usefully employed as a dynamic surface tension reducing agent, said agent preferably has a molecular weight below 350 Daltons.

In further embodiments, the inkjet ink set can further comprise one or more ancillary inks chosen from a photo-black ink, a text-black ink, a clear ink, a light cyan ink, a light magenta ink an orange ink, a green ink, a white ink, a red ink, a violet ink, a blue ink, and a brown ink, wherein the ancillary inks can further comprise a dynamic surface tension reducing agent agent.

In a preferred embodiment each of said cyan, magenta and yellow inks exhibits a 0.01 s surface age surface tension of less than 43.0 mN/m. In another preferred embodiment each of said cyan, magenta and yellow inks exhibits a viscosity of less than 3.0 cP.

In a preferred embodiment, each of said cyan, magenta and yellow ink is further characterized by exhibiting a viscosity normalized dynamic surface tension at surface refresh ages of 0.01 s of more than 10.5 mN/(m*cP); and the average viscosity normalized dynamic surface tension at a surface refresh age of 0.01 s for said cyan, magenta and yellow inks taken together is more than 11.5 mN/(m*cP). In a more preferred embodiment, the average viscosity normalized dynamic surface tension at a surface refresh age of 0.01 s for said cyan, magenta and yellow inks taken together is more than 14.0 mN/(m*cP).

The aims of the present invention are additionally achieved by an inkjet printing method comprising the step of applying to a recording medium by thermal, stream or piezo ejection an ink set as described above. More particularly, the invention also provides an inkjet printing method comprising the steps of a) providing an inkjet printer that is responsive to digital data signals; b) loading the printer with an inkjet recording receiver; c) loading the printer with the inkjet ink set of the invention; and d) printing on the inkjet receiver with the ink set of the invention in response to the digital data signals.

The aims of the present invention are additionally achieved by providing an inkjet cartridge suitable for supplying ink to an ink ejector, said cartridge having a series of ink reservoirs loaded with an ink set in accordance with the invention.

DETAILED DESCRIPTION OF THE INVENTION

The inkjet ink sets of the invention comprise aqueous inks, each comprising at least 65% and preferably at least 70% by weight water. This constraint causes the inks to dry quickly by evaporation and serves to limit the viscosity of the inks, thus aiding the attainment of the desired ink properties associated with the invention.

The inkjet ink set of the invention comprises at least one cyan colored ink, at least one magenta colored ink and at least one yellow colored ink. In each case, the inks are preferentially applied to a plain paper or a photo-glossy medium by thermal, stream or piezo ejection. The inks according to the invention can be applied in an overlapping mode to a common area of the recording media or in non-overlapping mode to adjacent areas of the recording medium, all as know in the inkjet ink application art.

Dispersed pigment colorants are employed in the cyan, magenta and yellow inkjet inks of inkjet ink set of the invention. Pigment-based ink compositions are used because such inks render printed images having higher optical densities and better resistance to light and ozone as compared to printed images made from other types of colorants. For the purposes of this invention, the yellow colorant has maximum absorption in the visible range between 400 and 500 nm, the magenta colorant has a wavelength extinction maximum longer than that of the yellow colorant employed and between 490 and 590 nm, and the cyan colorant has a wavelength extinction maximum longer than that of the magenta colorant employed and between 580 and 650 nm. In a preferred embodiment, the yellow colorant has maximum absorption in the visible range between 400 and 510 nm, the magenta colorant has a wavelength extinction maximum between 510 and 570 nm, and the cyan colorant has a wavelength extinction maximum between 590 and 640 nm.

The pigment colorants are employed at between 1 and 5% by weight in the cyan, magenta and yellow inks, and in a preferred mode are present at between 2% by weight and 4% by weight. The dispersed pigment colorant preferably exhibits an average volume weighted $50^{th}$ percentile particle size of between 0.001 and 0.085 microns. The ink preferentially has dispersed pigment colorant particles exhibiting an average volume weighted $50^{th}$ percentile particle size of between 0.005 and 0.075 microns, more preferably between 0.005 and 0.050 microns. Substantially smaller pigment particles form less stable images, while substantially larger pigment particles fail to provide desired gloss characteristics.

The ink sets of the invention can be augmented with the addition of ancillary inks such as black ink(s), including Photo-black inks, gray inks and text-black inks, clear inks to act as gloss aids and protective overcoats and red, green, blue, brown, orange, violet, light-cyan (photo-cyan) and light-magenta (photo-magenta) inks, and so forth to aid in pictorial reproduction, all as known in the inkjet art. For ancillary light inks, or the so-called photo-inks, the dispersed pigment colorants are preferably present at between 0.2% and 1% by weight and in amore preferred mode are present at between 0.4 and 0.9% by weight. Two or more inks of similar color but distinct composition, such as a light ink and a dark ink, e.g., can be used to form a finely graduated or continuous photo-tone image. Ink sets of the invention can further contain both distinct colored inks and similarly colored inks of distinct composition. For best results, ancillary inks can additionally comprise a dynamic surface tension reducing agent, and/or otherwise conform to the other constraints set out for the cyan, magenta and yellow inks of the inventive inkjet ink set.

A wide variety of organic and inorganic pigments, alone or in combination with additional pigments or dyes, can be used in the cyan, magenta and yellow, and ancillary ink compositions, which may be employed in the ink sets of the present invention. Pigments that may be used in the invention include those disclosed in, for example, U.S. Pat. Nos. 5,026,427; 5,085,698; 5,141,556; 5,160,370; and 5,169,436. The exact choice of pigments will depend upon the specific application and performance requirements such as color reproduction and image stability.

Pigments suitable for use in the invention include, but are not limited to, azo pigments, monoazo pigments, di-azo pigments, azo pigment lakes, β-Naphthol pigments, Naphthol AS pigments, benzimidazolone pigments, di-azo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black.

Typical examples of pigments that may be used include Color Index (C. I.) Pigment Yellow 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 154, 155, 165, 166, 167, 168, 169, 170, 171, 172, 173, 174, 175, 176, 177, 179, 180, 181, 182, 183, 184, 185, 187, 188, 190, 191, 192, 193, 194; C. I. Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 48:4, 49:1, 49:2, 49:3, 50:1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, 264; C.I. Pigment Blue 1, 2, 9, 10, 14, 15:1, 15:2, 15:3, 15:4, 15:6, 15, 16, 18, 19, 24:1, 25, 56, 60, 61, 62, 63, 64, 66, bridged aluminum phthalocyanine pigments; C. I. Pigment Black 1, 7, 20, 31, 32; C. I. Pigment Orange 1, 2, 5, 6, 13, 15, 16, 17, 17:1, 19, 22, 24, 31, 34, 36, 38, 40, 43, 44, 46, 48, 49, 51, 59, 60, 61, 62, 64, 65, 66, 67, 68, 69; C.I. Pigment Green 1, 2, 4, 7, 8, 10, 36, 45; C.I. Pigment Violet 1, 2, 3, 5:1, 13, 19, 23, 25, 27, 29, 31, 32, 37, 39, 42, 44, 50; or C.I. Pigment Brown 1, 5, 22, 23, 25, 38, 41, 42.

White pigments, which may be used in ancillary white ink compositions, may be those which are capable of rendering said ink composition white. Any of several white pigments, which are commonly used in this field, may be employed. Employed as such white pigments may be, for example, white inorganic pigments, white organic pigments, and fine white hollow polymer particles. White pigments include inorganic pigments such as sulfates of alkaline earth metals such as barium sulfate, carbonates of alkaline earth metals such as calcium carbonate, silica such as fine silicic acid powder, synthetic silicates, calcium silicate, alumina, alumina hydrates, titanium oxide, zinc oxide, talc, and clay. Specifically, titanium oxide is known as a white pigment which exhibits desired covering properties, coloring (tinting) properties, and desired diameter of dispersed particles. White organic pigments include organic compound salts disclosed in JP-A No. 11-129613, and alkylenebismelamine derivatives disclosed in JP-A Nos. 11-140365 and 2001-234093. Specific commercially available products of the aforesaid white pigments are Shigenox OWP, Shigenox OWPL, Shigenox FWP, Shigenox FWG, Shigenox UL, and Shigenox U (all are commercial product names, by Hakkoru Chemical Co.). Additionally fine white hollow polymer particles such as fine thermoplastic particles comprised substantially of an organic polymer, which are disclosed in U.S. Pat. No. 4,089,800 may be employed.

Pigment-based ink compositions employing non-self-dispersed pigments that are useful in the invention may be prepared by any method known in the art of inkjet printing. Useful methods commonly involve two steps: (a) a dispersing or milling step to break up the pigments to primary particles, where primary particle is defined as the smallest identifiable subdivision in a particulate system, and (b) a dilution step in which the pigment dispersion from step (a) is diluted with the remaining ink components to give a working strength ink.

The milling step (a) is carried out using any type of grinding mill such as a media mill, a ball mill, a two-roll mill, a three-roll mill, a bead mill, and air-jet mill, an attritor, or a liquid interaction chamber. In the milling step (a), pigments are optionally suspended in a medium that is typically the same as or similar to the medium used to dilute the pigment dispersion in step (b). Inert milling medium is optionally present in the milling step (a) in order to facilitate break up of the pigments to primary particles. Inert milling media include such materials as polymeric beads, glasses, ceramics, metals and plastics as described, for example, in U.S. Pat. No. 5,891, 231. Milling media are removed from either the pigment dispersion obtained in step (a) or from the ink composition obtained in step (b).

A dispersant is optionally present in the milling step (a) in order to facilitate break up of the pigments into primary particles. For the pigment dispersion obtained in step (a) or the ink composition obtained in step (b), a dispersant is optionally present in order to maintain particle stability and prevent settling. Dispersants suitable for use in the invention include, but are not limited to, those commonly used in the art of inkjet printing. For aqueous pigment-based ink compositions, particularly useful dispersants include anionic, cationic or nonionic surfactants such as sodium dodecylsulfate, or potassium or sodium oleylmethyltaurate as described in, for example, U.S. Pat. No. 5,679,138, U.S. Pat. No. 5,651,813 or U.S. Pat. No. 5,985,017, the disclosures of which are incorporated by reference.

Self-dispersing pigments that are dispersible without the use of a dispersant or surfactant can be used in the invention. Pigments of this type are those that have been subjected to a surface treatment such as oxidation/reduction, acid/base treatment, or functionalization through coupling chemistry. The surface treatment can render the surface of the pigment with anionic, cationic or non-ionic groups such that a separate dispersant is not necessary. The preparation and use of covalently functionalized self-dispersed pigments suitable for inkjet printing are reported by Bergemann, et al., in U.S. Pat. No. 6,758,891 B2 and U.S. Pat. No. 6,660,075 B2, Belmont in U.S. Pat. No. 5,554,739, Adams and Belmont in U.S. Pat. No. 5,707,432, Johnson and Belmont in U.S. Pat. Nos. 5,803,959 and 5,922,118, Johnson et al in and U.S. Pat. No. 5,837,045, Yu et al in U.S. Pat. No. 6,494,943 B1, and in published applications WO 96/18695, WO 96/18696, WO 96/18689, WO 99/51690, WO 00/05313, and WO 01/51566, Osumi et al., in U.S. Pat. No. 6,280,513 B1 and U.S. Pat. No. 6,506,239 B1, Karl, et al., in U.S. Pat. No. 6,503,311 B1, Yeh, et al., in U.S. Pat. No. 6,852,156 B2, Ito et al., in U.S. Pat. No. 6,488,753 B1 and Momose et al., in EP 1,479,732 A1, Examples of commercially available self-dispersing type pigments include Cab-O-Jet 200®, Cab-O-Jet-250®, Cab-O-Jet-260®, Cab-O-Jet-270®, and Cab-O-Jet 300® (Cabot Specialty Chemicals, Inc.) and Bonjet CW-1® and CW-2® (Orient Chemical Industries, Ltd.).

Polymeric dispersants are also known and useful in aqueous pigment-based ink compositions. Polymeric dispersants may be added to the pigment dispersion prior to, or during the milling step (a), and include polymers such as homopolymers and copolymers; anionic, cationic or nonionic polymers; or random, block, branched or graft polymers. Polymeric dispersants useful in the milling operation include random and block copolymers having hydrophilic and hydrophobic portions; see for example, U.S. Pat. No. 4,597,794; U.S. Pat. No. 5,085,698; U.S. Pat. No. 5,519,085; U.S. Pat. Nos. 5,272,201; 5,172,133; U.S. Pat. No. 6,043,297 and WO 2004/111140A1; and graft copolymers; see for example, U.S. Pat. No. 5,231, 131; U.S. Pat. No. 6,087,416; U.S. Pat. No. 5,719,204; or U.S. Pat. No. 5,714,538. Typically, these polymeric resins are copolymers made from hydrophobic and hydrophilic monomers. In this case, the copolymers are designed to act as dispersants for the pigment by virtue of the arrangement and proportions of hydrophobic and hydrophilic monomers. The pigment particles are colloidally stabilized by the dispersant and are referred to as a polymer dispersed pigment dispersion.

Polymeric dispersants (copolymers) are not limited in the arrangement of the monomers comprising the copolymer. The arrangement of monomers may be totally random, or they may be arranged in blocks such as AB or ABA wherein, A is the hydrophobic monomer and B is the hydrophilic monomer. In addition, the polymer may take the form of a random terpolymer or an ABC tri-block wherein, at least one of the A, B and C blocks is chosen to be the hydrophilic monomer and the remaining blocks are hydrophobic blocks dissimilar from one another.

Especially useful copolymer dispersants are those where the hydrophobic monomer is selected from benzyl methacrylate or acrylate, or from methacrylic or acrylic acid esters containing an aliphatic chain having twelve or more carbons, which aliphatic chains may be linear or branched. Examples of methacrylic and acrylic acid esters having twelve or more carbons include; lauryl acrylate, lauryl methacrylate, tridecyl acrylate, tridecyl methacrylate, tetradecyl acrylate, tetradecyl methacrylate, cetyl acrylate, iso-cetyl acrylate, stearyl methacrylate, iso-stearyl methacrylate, stearyl acrylate, stearyl methacrylate, decyltetradecyl acrylate, decyltetradecyl methacrylate, and the like. Preferably the methacrylate or acrylate monomer is stearyl or lauryl methacrylate or acrylate. The hydrophobic portion of the polymer may be prepared from one or more of the hydrophobic monomers.

Preferred copolymer dispersants are those where the hydrophilic monomer is selected from carboxylated monomers. Preferred polymeric dispersants are copolymers prepared from at least one hydrophilic monomer that is an acrylic acid or methacrylic acid monomer, or combinations thereof. Preferably, the hydrophilic monomer is methacrylic acid.

Typically, the weight average molecular weight of the copolymer dispersant has an upper limit such that it is less than about 50,000 Daltons. Desirably the weight average molecular weight of the copolymer is less than about 25,000 Daltons; more preferably it is less than 15,000 and most preferably less than 10,000 Daltons. The copolymer dispersants preferably have a weight average molecular weight lower limit of greater than about 500 Daltons.

In one preferred embodiment, copolymer dispersants are employed wherein the hydrophobic monomer is benzyl methacrylate and is present from 50 weight percent to 80 weight percent relative to the total weight of the polymeric dispersant and the hydrophilic monomer is methacrylic acid.

In a second preferred embodiment, copolymer dispersants are employed which comprise a hydrophobic monomer having a carbon chain length of greater than or equal to 12 carbons present in an amount of at least 10% by weight of the total copolymer, and more preferably greater than 20% by weight, an optional additional hydrophobic monomer comprising an aromatic group and the hydrophilic monomer is methacrylic acid. For example, the additional aromatic group containing monomer may be benzyl acrylate or benzyl methacrylate. A preferred additional monomer is benzyl methacrylate.

The total amount of hydrophobic monomers, comprising the monomer having a chain with greater than or equal to 12 carbons and optionally, monomer containing an aromatic group, may be present in the polymer in an amount of 20 to 95% by weight of the total polymer. The hydrophobic aromatic-group containing monomer may be present in an amount from about 0 to 85% by weight of the total polymer, more preferably from about 0 to 60%, and most preferably from about 0 to 50%. A particularly preferred embodiment is a terpolymer of benzyl methacrylate, stearyl methacrylate and methacrylic acid.

Particularly useful polymeric pigment dispersants are further described in US 2006/0012654 A1 and US 2007/0043144A1, the disclosures of which are incorporated herein by reference.

Encapsulating type polymeric dispersants and polymeric dispersed pigments thereof can also be used in the invention. Specific examples are described in U.S. Pat. No. 6,723,785, U.S. Pat. No. 6,852,777, US 2004/0132942 A1, 2005/0020731 A1, 2005/0009951, 2005/0075416 A1, 2005/0124726 A1, 2004/0077749, and 2005/0124728 A1, the disclosures of which are incorporated by reference. Encapsulating type polymeric dispersants can be especially useful because of their high dispersion stability on keeping and low degree of interaction with ink components. Composite colorant particles having a colorant phase and a polymer phase are also useful in aqueous pigment-based inks of the invention. Composite colorant particles are formed by polymerizing monomers in the presence of pigments; see for example, US 2003/0199614 A1; US 2003/0203988 A1; or US 2004/0127639. Microencapsulated-type pigment particles are also useful and consist of pigment particles coated with a resin film; see for example U.S. Pat. No. 6,074,467.

In addition to dispersed pigment colorants, the inks of the ink sets of the invention can further contain dyes as supplemental colorants. Dyes suitable for use in the invention include, but are not limited to, those commonly used in the art of inkjet printing. For aqueous-based ink compositions, such dyes include water-soluble reactive dyes, direct dyes, anionic dyes, cationic dyes, acid dyes, food dyes, metal-complex dyes, phthalocyanine dyes, anthraquinone dyes, anthrapyridone dyes, azo dyes, rhodamine dyes, solvent dyes and the like. Specific examples of dyes usable in the present invention include but are not limited to: Acid Yellows, Reactive Yellows, Food Yellows, Acid Reds, Direct Reds, Reactive Reds, Food Reds, Acid Blues, Direct Blues, Reactive Blues, Food Blues, Acid Blacks, Direct Blacks, Reactive Blacks, Food Black, CAS No. 224628-70-0 sold as JPD Magenta EK-1 Liquid from Nippon Kayaku Kabushiki Kaisha; CAS No. 153204-88-7 sold as Intrajet® Magenta KRP from Crompton and Knowles Colors; and the metal azo dyes disclosed in U.S. Pat. Nos. 5,997,622 and 6,001,161. Also useful in the invention as supplemental colorants are polymeric dyes or loaded-dye/latex particles. Examples of polymeric dyes are described in U.S. Pat. No. 6,457,822 B1 and references therein. Examples of loaded-dye/latex particles are described in U.S. Pat. No. 6,431,700 B1; US 2004/0186199 A1; US 2004/0186198 A1; US 2004/0068029 A1; US 2003/0119984 A1; and US 2003/0119938 A1. The supplemental colorants used in the ink composition of the invention may be present in any effective amount, generally from 0.1 to 10% by weight, and preferably from 0.5 to 6% by weight.

The inks of the ink set of the invention comprise a surfactant that reduces static surface tension, added to adjust the static surface tension of the ink to an appropriate level. The surfactants may be anionic, cationic, amphoteric or nonionic and used at, e.g., levels of 0.01 to 5% of the ink composition. Examples of suitable nonionic surfactants include, linear or secondary alcohol ethoxylates (such as the Tergitol® 15-S and Tergitol® TMN series available from Union Carbide and the Brij® series from Uniquema), ethoxylated alkyl phenols (such as the Triton® series from Union Carbide), fluoro surfactants (such as the Zonyls® from DuPont; and the Fluorads® from 3M), fatty acid ethoxylates, fatty amide ethoxylates, ethoxylated and propoxylated block copolymers (such as the Pluronic® and Tetronic® series from BASF, ethoxylated and propoxylated silicone based surfactants (such as the Silwet® series from CK Witco), alkyl polyglycosides (such as the Glucopons® from Cognis) and acetylenic polyethylene oxide surfactants (such as the Surfynols® from Air Products). Additionally any conformationally asymmetric water-soluble polyoxygenated hydrocarbons enabling surface tension reduction can be employed as a surfactant. Further examples of anionic surfactants include; carboxylated (such as ether carboxylates and sulfosuccinates), sulfated (such as sodium dodecyl sulfate), sulfonated (such as dodecyl benzene sulfonate, alpha olefin sulfonates, alkyl diphenyl oxide disulfonates, fatty acid taurates and alkyl naphthalene sulfonates), phosphated (such as phosphated esters of alkyl and aryl alcohols, including the Strodex® series from Dexter Chemical), phosphonated and amine oxide surfactants and anionic fluorinated surfactants. Examples of amphoteric surfactants include; betaines, sultaines, and aminopropionates. Examples of cationic surfactants include; quaternary ammonium compounds, cationic amine oxides, ethoxylated fatty amines and imidazoline surfactants. Additional examples of the above surfactant classes are described in "McCutcheon's Emulsifiers and Detergents: 1995, North American Editor". While the charged surfactants all tend to have slow diffusion in aqueous inks due to the aggregated water of hydration which effectively increases their bound mass, the useful nonionic surfactants preferably have molecular weight above 350 Daltons, more preferably above 400 Daltons and most preferably above 500 Daltons, to ensure slow diffusion in bulk ink so as to allow distinct control of static or equilibrium inks surface tensions. It is specifically contemplated to employ mixtures of suitable surfactants for each individual ink. The distinct cyan, magenta and yellow inks employed in the invention can employ the same of different surfactants or surfactant mixtures so as to enable the desired ink physical properties.

Dynamic surface tension reducing agents (DST agents) as known in the art are also employed in the cyan, magenta and yellow inks of the ink sets of the invention, where the dynamic surface tension reducing agent is distinct from the surfactant. By employing a distinct DST agent in addition to a surfactant, the dynamic surface tension may be better individually optimized to achieve the objects of the invention. Dynamic surface tension reducing agents employed preferably comprise an asymmetric polyhydric alcohol or a mono-alkyl ether derived from a polyhydric alcohol. Specific examples of lower mono-alkyl ethers derived from the polyhydric alcohols include but are not limited to ethylene glycol monomethyl ether, ethylene glycol monobutyl ether, ethylene glycol monoethyl ether acetate, diethylene glycol monomethyl ether, diethylene glycol monobutyl ether, triethylene glycol monobutyl ether, polyethylene glycol monobutyl ether, propylene glycol monopropyl ether and diethylene glycol monobutyl ether acetate, among others all as supplied as the Dowanol®, Cellusolve® and Carbitol® series from Dow Chemical. Specific examples of lower asymmetric polyhydric alcohols include but are not limited to: 1,2-butanediol, 1,2-pentanediol, 1,2-hexanediol, 1-phenyl-1,2-ethanediol, 1,2,6-hexanetriol, 1,2-heptanediol, 1,2-octanediol, and 1,3-hexanediol. Useful dynamic surface tension reducing agents also include diols such as 1,6-hexanediol, which conformationally folds back on itself in aqueous solution and functionally acts in an asymmetric manner to reduce surface tension at short times. Useful dynamic surface tension reducing agents additionally include the lower molecular weight acetylenic dialcohols and their polyalkyleneoxide derivatives.

The useful DST agents have molecular weights below 350 Daltons, more preferably below 280 Daltons and most preferably below 210 Daltons to ensure fast diffusion of the agent in the bulk ink so as to be in distinct control of the 0.01 s surface age surface tension critical to effective practice of the invention. Conversely, the useful DST agents of the invention also preferably have a molecular weight of greater than 76 Daltons and more preferably greater than 90 Daltons. This minimal molecular weight serves to ensure that the DST agent does not evaporate from the ink on extended storage and that the DST agent exhibits a Flash Point of over 96° C. as appropriate for a consumer product. The lower limit on molecular weight and volatility further ensures that the DST agent is present and active in the ink composition after jetting and while the ink is drying on the plain paper or glossy printing medium surface. Further, the useful DST agents have melting points below the typical operating temperature of the intended printer system to avoid the formation of crystalline deposits on the printhead or in the maintenance system. Practically, this means that the useful DST agents have melting points below 30° C., preferably below 20° C. and more preferably below 10° C.

When employing pigments having an average volume weighted 50$^{th}$ percentile particle size of less than 0.075, use of 1,2 pentanediol as a dynamic surface tension reducing agent in particular has been found to advantageously enable formation of storage stable inks as described in commonly assigned, concurrently filed, copending US Publication No. 2009/0169762, the disclosure of which is incorporated by reference herein in its entirety.

The cyan, magenta and yellow inks of the inkjet ink sets of the invention further include one or more water-soluble humectants (also called co-solvents), distinct from the surfactant and the dynamic surface tension reducing agent employed in the ink compositions, in order to provide useful properties to the inkjet ink. Typical useful properties include but are not limited to: preventing the ink composition from drying out or crusting in the nozzles of the printhead, aiding solubility of the components in the ink composition, aiding firing properties of the ink form an ejector, facilitating penetration of the ink composition into the image-recording element after printing, aiding gloss, suppressing intercolor bleed, suppressing coalescence, and suppressing mechanical artifacts such as paper cockle and curl during and after printing. While surfactants and DSTs may provide some of these properties, by employing at least one additional humectant distinct from the surfactant and the dynamic surface tension reducing agent employed, humectant requirements and surface tension requirements for the inks of the inventive inksets may be better controlled.

Any water-soluble humectant known in the ink-jet art and compatible with the other requirements of the invention can be employed. By water-soluble is meant that a mixture of the employed humectant(s) and water is homogeneous. While an individual humectant can be employed, useful inkjet inks can employ mixtures of two, three or more humectants, each of which imparts a useful property to the inkjet ink. Representative examples of humectants and co-solvents used in aqueous-based ink compositions include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) polyhydric alcohols, such as ethylene glycol, diethylene glycol, triethylene glycol, tetraethylene glycol, propylene glycol, dipropyleneglycol, the polyethylene glycols with average molecular weights ranging from 200 to about 5000 Daltons, the polypropylene glycols with average molecular weights ranging from 200 to about 5000 Daltons, 1,2-propanediol, 1,3-propanediol, 1,2-butanediol, 1,3-butanediol, 1,4-butanediol, 1,2,4-butanetriol, 3-methyl-1,3-butanediol, 2-methyl-1,3-propanediol, 1,5-pentanediol 1,6-hexanediol, 2-methyl-2,4-pentanediol, 1,7-heptanediol, 2-ethyl-1,3-hexane diol, 2,2,4-trimethyl-1,3-pentane diol, 1,8-octane diol, glycerol, 1,2,6-hexanetriol, 2-ethyl-2-hydroxymethyl-propanediol, 2-methyl-2-hydroxymethyl-propanediol, saccharides and sugar alcohols and thioglycol; (3) polyoxygenated polyols and their derivatives such as diglycerol, polyglycerols, glycerol ethoxides, glycerol propoxides, glyceryths, alkylated and acetylated glyceryths, pentaerythritol, pentaerythritol ethoxides, and pentaerythritol propoxides and their alkylated and acetylated derivatives; (4) nitrogen-containing compounds such as urea, 2-pyrrolidone, N-methyl-2-pyirolidone, imidazolidinone, N-hydroxyethyl acetamide, N-hydroxyethyl-2-pyrrolidinone, 1-(hydroxyethyl)-1,3-imidazolidinone, 1,3-dimetyl-2-imidazolidinone, and 1,3-dihydroxy-2-imidazolidinone; (5) sulfur-containing compounds such as 2,2'-thiodiethanol, dimethyl sulfoxide and tetramethylene sulfone; and (6) water soluble N-oxides such as 4-methylmorpholine-N-oxides. Of these, glycerol and the polyhydric alcohol derivatives thereof are preferred and glycerol is especially preferred. The polyhydric alcohol derivatives of glycerol include the glycerol ethoxides, glycerol propoxides and glyceryths. The humectant can be employed alone or in combination with one or more additional listed humectants. The useful humectants have melting points below the typical operating temperature of the intended printer system to avoid the formation of crystalline deposits on the printhead or in the maintenance system. Practically, this means that the useful humectants have melting points below 30° C., preferably below 20° C. and more preferably below 10° C. When glycerol and the polyhydric alcohol derivatives thereof are employed, they can preferably be employed at between 1 and 20% by weight, more preferable at between 2 and 15% by weight and most preferable at between 3 and 10% by weight. While any quantity of water soluble humectants singly or in combination and dynamic surface tension reducing agents can be employed, the total quantity of water soluble humectant and dynamic surface tension reducing agents is preferably at between 3 and 30 percent by weight and more preferably at between 8 and 20 percent by weight.

The pH of the aqueous ink compositions of the invention may be adjusted by the addition of organic or inorganic acids or bases. Useful inks may have a preferred pH of from about 2 to 10, depending upon the type of dye or pigment being used and depending on the charge characteristics of the other ink components employed. Anionic charge stabilized anti-abrasion polymers are employed in inks having a pH of above about 6, with preferred pH ranges of between 7 and 11 and a more preferred pH range of between 7.5 and 10. Typical inorganic acids include nitric, hydrochloric, phosphoric and sulfuric acids. Typical organic acids include methanesulfonic, acetic, formic and lactic acids. Typical inorganic bases include alkali metal hydroxides and carbonates. Typical organic bases include ammonia, triethanolamine and tetramethylethlenediamine. The well known Goods buffers can also be employed.

Inkjet ink compositions may also contain non-colored particles such as inorganic particles or polymeric particles. The use of such particulate addenda has increased over the past several years, especially in inkjet ink compositions intended for photographic-quality imaging. For example, U.S. Pat. No. 5,925,178 describes the use of inorganic particles in pigment-based inks in order to improve optical density and rub resistance of the pigment particles on the image-recording element. In another example, U.S. Pat. No. 6,508,548B2 describes the use of a water-dispersible polymer in dye-based inks in order to improve light and ozone resistance of the printed images. For use of such particles to improve gloss differential, light and/or ozone resistance, waterfastness, rub resistance and various other properties of a printed image; see for example, U.S. Pat. No. 6,598,967B1. Colorless ink compositions that contain non-colored particles and no colorant may also be used. Colorless ink compositions are often used in the art as "fixers" or insolubilizing fluids that are printed under, over, or with colored ink compositions in order to reduce bleed between colors and waterfastness on plain paper; see for example, U.S. Pat. No. 5,866,638 or U.S. Pat. No. 6,450,632B1. Colorless inks are also used to provide an overcoat to a printed image, usually in order to improve scratch resistance and waterfastness; see for example, US 2002/0009547 or EP 1,022,151 A1. Colorless inks are also used to reduce gloss differential in a printed image; see for example, U.S. Pat. No. 6,604,819 B2; US 2003/0085974A1; US 2003/0193553A1; or US 2003/0189626A1.

Examples of inorganic particles useful in the invention include, but are not limited to, alumina, boehmite, clay, calcium carbonate, titanium dioxide, calcined clay, aluminosilicates, silica, or barium sulfate.

The non-colored particles used in the ink compositions may be present in any effective amount, generally from 0.01 to 20% by weight, and preferably from 0.01 to 6% by weight. The exact choice of non-colored particles will depend upon the specific application and performance requirements of the printed image.

Polymers can be present in the inkjet inks of the invention. The polymers can act as binders or jetting-aids or can fulfill other useful functions. These polymers can be classified as water-soluble polymers, water-reducible polymers or water-dispersible polymeric particles.

By the term "water-soluble" is meant that the polymer is dissolved in water such that scattering is not observed when a dilute solution of the polymer is analyzed using dynamic light scattering or any other technique well known in the art of particle analysis.

By the term "water-reducible" is meant that the polymer can be diluted with water to form reasonably stable dispersions of polymer aggregates swollen by solvent and water, as described in "Organic Coatings: Science and Technology" (2nd Edition by Wicks, Jones and Papas, published by Wiley-Interscience, 1999). Such polymers have hydrophilic groups in some monomers, but are not water soluble until neutralized by base.

By the term "water-dispersible" is meant that the polymer exists in the form of discrete particles in water, the particles being dispersed or suspended and often stabilized against flocculation and settling by the use of dispersing agents. In contrast to a water-soluble polymer, a dilute solution of a water-dispersible polymer exhibits scattering when analyzed using dynamic light scattering or any other technique well known in the art of particle analysis.

The water soluble polymers useful in the ink compositions include nonionic, anionic, and amphoteric polymers. Representative examples of water soluble polymers include, polyvinyl alcohols, polyvinyl acetates, polyvinyl pyrrolidones, carboxymethyl cellulose, polyethyloxazolines, polyamides and alkali soluble resins, polyurethanes (such as those found in U.S. Pat. No. 6,268,101), polyacrylic acids, styrene-acrylic methacrylic acid copolymers (such as Joncryl® 70 from S.C. Johnson Co., TruDot® IJ-4655 from MeadWestvaco Corp., and Vancryl® 68S from Air Products and Chemicals, Inc and polymers exemplified in U.S. Pat. No. 6,866,379 and US 2005/0134665 A1.

The water-dispersible polymer particles are generally classified as either addition polymers or condensation polymers, both of which are well known to those skilled in the art of polymer chemistry. Examples of water-dispersible polymer particle classes include acrylics, styrenics, polyethylenes, polypropylenes, polyesters, polyamides, polyurethanes, polyureas, polyethers, polycarbonates, polyacid anhydrides, and copolymers consisting of combinations thereof. Such polymer particles can be ionomeric; film-forming, non-film-forming, fusible, or heavily cross-linked and can have a wide range of molecular weights and glass transition temperatures. Examples of water dispersible polymeric particles used in inkjet inks are styrene-acrylic copolymers sold under the trade names Joncryl® (S.C. Johnson Co.), Ucar™ (Dow Chemical Co.), Jonrez® (MeadWestvaco Corp.), and Vancryl® (Air Products and Chemicals, Inc.); sulfonated polyesters sold under the trade name Eastman AQ® (Eastman Chemical Co.); polyethylene or polypropylene resin emulsions and polyurethanes (such as the Witcobonds® from Witco Corp.). Core-shell polymer particles have also been employed in inkjet inks for water-fastness and rub-resistance improvements (U.S. Pat. Nos. 5,814,685, 5,912,280, 6,057,384, 6,271,285, 6,858,301). Additional examples of water dispersible polymer particles include the thermoplastic resin particles as disclosed in U.S. Pat. Nos. 6,147,139 and 6,508,548. The polymer particles may be a mixture of high and low glass transition temperature polymers such as those disclosed in U.S. Pat. No. 6,498,202. Additionally, core-shell polymer particles as described in U.S. Pat. Nos. 5,814,685, 5,912,280, 6,057,384, 6,271,285, and 6,858,301 can be employed. It is also possible to include in the ink, in addition to the durability enhancing polymer particles, heavily cross-linked polymer particles.

Particularly preferred polymers for use in the cyan, magenta and yellow inks of the ink sets of the invention are water soluble polyacrylate polymers and polyurethane latex binder polymers. Polyester polymers, i.e. polymers having ester backbone linkages are not preferred since the hydrolysis of the ester function in the aqueous ink on storage can lead to polymer backbone fragmentation and loss of functionality. For similar reasons polymers having side-chain ester functions are less favored.

While any useful quantity of a water soluble polyacrylate polymer can be employed, the inks of the invention can preferably comprise between 0.1% and 3% by weight of a water soluble polyacrylate polymer. The water soluble polyacrylate polymers can be either addition polymers or condensation polymers, both of which are well known to those skilled in the art of polymer chemistry. Specific examples include, but are not limited to: acrylic acid polymer; methacrylic acid polymer; styrene-acrylic acid copolymer, styrene-acrylic acid-acrylic acid alkyl ester copolymer, styrene-maleic acid copolymer, styrene-maleic acid-acrylic acid alkyl ester copolymer, styrene-methacrylic acid copolymer, styrene-methacrylic acid-acrylic acid alkyl ester copolymer, styrene-maleic acid hemi ester copolymer, vinyl naphthalene-acrylic acid copolymer, vinyl naphthalene-maleic acid copolymer and so forth. Especially preferred water soluble polyacrylate polymers include benzylmethacrylate-acrylic acid copolymers and styrene maleic acid hemi ester copolymers. These polymers are rendered water soluble by the presence of the acid group originating in the acrylic acid, maleic acid or methacrylic acid moiety of the polymer. For polymers including acid groups, the extent of polymer charge stabilization is quantified as the polymer acid number (AN). A calculated polymer acid number is defined as the number of moles of acid monomer per gram of monomer in the polymer forming feedstock times 56 (which is the molecular weight of potassium hydroxide). A measured acid number is the number of moles of acid found per gram of polymer times 56, when titrating with potassium hydroxide in water. The water soluble polyacrylate polymer preferably exhibits an acid number between 100 and 400 and more preferably between 140 and 300 and a weight average molecular weight Mw between 5000 and 20,000 and more preferably between 6,000 and 16,000.

While any useful quantity of a polyurethane latex binder can be employed, the cyan, magenta and yellow inks of the ink set of the invention in a preferred embodiment each preferably comprise between 0.1 and 3% by weight, and more preferably present at between 0.5 and 2% by weight of a polyurethane latex binder.

The polyurethane latex binder is formed from at least one monomer comprising at least two hydroxyl groups and at least one carboxyl group and another monomer comprising at least two isocyanate groups. While diisocyanates are typically used in the art of polyurethane chemistry, triisocyanates can also be used. Examples of diisocyanates include isophorone diisocyanate and others described in the above references. The polyurethanes used in the invention are optionally derived from an additional monomer comprising at least two hydroxyl groups and which is different from the monomer having at least two hydroxyl groups. These optional monomers are typically higher molecular weight monomers having a molecular weight of less than 3000 Daltons. They are often referred to in the art as polyols. Examples include polyols and polyhydroxy derivatives of polycarbonates, polyethers, polyesters, polyacetals, polyacrylates, polyester amides and polythioethers. Preferably the optional monomer is a polycarbonate or a polyether. More preferably, the optional monomer comprising at least two hydroxyl groups is a poly (hexamethylene carbonate) diol. Examples of monomers comprising at least two hydroxyl groups and at least one carboxylic acid group are 2,2-bis (hydroxymethyl) propionic acid and the hydroxyethylether of 4,4-bis (4-hydroxyphenyl)-valeric acid. Other examples are described in U.S. Pat. No. 6,268,101B2 and US 2003/0184629A1 and references cited therein. Water-dispersible polyurethanes are disclosed as binders in pigmented inks in U.S. Pat. No. 6,533,408, and particularly useful polyurethanes for pigmented inkjet inks which exhibit good jetting performance and good resulting image durability are described in US 2004/0085419A1, the disclosures of both are incorporated herein by reference. The polyurethane used in the invention has a weight average molecular weight, Mw, of greater than 7,500 Daltons. If Mw is less than 7,500 Daltons, then the inkjet ink composition may not provide adequate stain and scratch resistance. A Mw of greater than 10,000 Daltons is preferred. The maximum Mw of the polyurethane is not particularly limited, but is generally dictated by the physical property requirements of the composition and the method by which it will be applied, as discussed below. If the ink composition is used as an inkjet ink for a thermal printhead, then the maximum Mw of the polyurethane is preferably 50,000 Daltons. The acid number of the polyurethane is provided by acid groups that are, in turn, provided by the at least one monomer comprising at least two hydroxyl groups. The acid groups are preferably carboxylic acid groups, but any type of acid groups may be used. The polyurethane latex binder can have an acid number between 50 and 200 and preferably has an acid number between 60 and 150 and most preferably between 70 to 110. The polyurethane used in the invention can exhibit a Tg of between 20 and 180° C., preferably a Tg of between 40 and 120° C., and more preferably a Tg of between 60 and 100° C.

When these kinds of polymers are employed, best results are obtained when the weight ratio of dispersed pigment to the sum of water soluble polyacrylate polymer and polyurethane latex binder is between 3:1 and 1:2. More preferably, the weight ratio of dispersed pigment to the sum of water soluble polyacrylate polymer and polyurethane latex binder is between 2:1 and 1:1. Lower quantities of polymer can cause poor jetting or poor film formation while higher quantities of polymer can cause poor jetting, clogging of ejectors or printer maintenance stations and ink coalescence on many printing media.

A biocide may be added to an inkjet ink composition to suppress the growth of microorganisms such as molds, fungi, etc. in aqueous inks. A preferred biocide for an ink composition is Proxel® GXL (Zeneca Specialties Co.) at a final concentration of 0.0001-0.5 wt. % or Kordek®. Additional additives, which may optionally be present in an inkjet ink composition include thickeners, conductivity enhancing agents, anti-kogation agents, drying agents, waterfastness agents, dye solubilizers, chelating agents, binders, light stabilizers, viscosifiers, buffering agents, anti-mold agents, anti-curl agents, stabilizers and defoamers.

The exact choice of ink components will depend upon the specific application and performance requirements of the printhead from which they are to be Jetted. Thermal and piezoelectric printheads which can function either in drop-on-demand ink ejection mode or continuous ink ejection mode each require ink compositions with a different set of physical properties in order to achieve reliable and accurate jetting of the ink, as is well known in the art of inkjet printing. Acceptable viscosities are no greater than 4 cP, and preferably in the range of about 1.0 to 3.6 cP and more preferably in the range of 1.5 to 3.0 cP. Acceptable static surface tensions are no greater than 60.0 mN/m, and preferably in the range of 28.0 mN/m to 40.0 mN/m. The 0.01 s surface age surface tension of the inks useful in the invention is less than 43.0 mN/m, preferably less than 42.0 mN/m and most preferably less than 39.0 mN/m.

Ink Viscosity can be measured by any of a large number of well known techniques. Preferred methods include measurement of the timing of mass flow through a capillary as in a capillary viscometer, or measurement of ball drop velocity through a fluid, using for example a rolling ball viscometer. Both a capillary flow viscometer and a commercially available Anton Paar Automated MicroViscometer (AMVn) employing the rolling ball technique were used to measure the viscosities reported herein. All ink viscosity values disclosed herein were measured under gravity induced shear at 24° C. to 26° C. It will be appreciated that the values cited are reported as centiPoise (cP) and that 1 cP=$10^{-3}$ Pascal-seconds (Pa*s)=$10^{-2}$ dyne*S/$CM^2$. While viscosities can be measured with high precision, viscosity values here are reported to one or two decimal places only and when values of ink viscosities of ink set viscosities are reported, they are normally rounded values and not truncated values. All claims reciting ink viscosities are intended to be interpreted in terms of values in cP normally rounded to one decimal.

The Wilhelmy plate method is a well known technique for measuring the static surface tension of a liquid at a solid interface. The technique involves a plate of known dimensions, typically selected from a roughened platinum alloy, suspended from a balance. The plate is contacted with a solution of interest and a vertical force is applied to the plate to form a liquid meniscus between the solution and plate. The resulting surface tension is given according to:

$$\sigma = F/L \cos(\theta)$$

where,
$\sigma$ is the surface tension of the liquid
F is the force acting on the balance (milli-Newtons/meter)
L is the wetted length of the plate in millimeters
$\theta$ is the contact angle between the plate and solution.
Typically, the roughened platinum results in a contact angle very close to zero and the cosine of $\theta$ goes to 1. A complete theoretical treatment of the method can be found in, for example, "A Method for Determining Surface and Interfacial Tension Using a Wilhelmy Plate", Colloid and Polymer Science, 255(7), pages 675-681. A number of commercially available instruments are known for measuring surface tension, however, the instrument used to report surface tension values in the present invention is a Kruss Model K10ST tensiometer.

Dynamic surface tension is a well known property and there are several techniques for measuring dynamic surface tension. The technique used to measure dynamic surface tension of the inventive ink sets herein is called the maximum bubble pressure method. The technique is described in detail in several publications, including "The Measurement of Dynamic Surface Tension by the Maximum Bubble Pressure Method", Colloid and Polymer Science, vol. 272, pages 731-739, 1994.

The operating principle behind the maximum bubble pressure method involves a stream of air being directed through a narrow circular cylindrical capillary where the capillary is submersed into the solution of interest, here an inkjet ink. The air stream forms an air bubble as it exits the capillary and is forced into the ink solution. The surface tension of the ink is determined by use of equation (1):

$$\Delta P = P_b - P_s = 2\sigma/R \qquad (1)$$

where $P_b$ is the pressure inside the air bubble, $P_s$ is the pressure in the surrounding solution, $\sigma$ is the surface tension of the ink and R is the radius of the air bubble. At the point where the radius of the bubble, R is equal to the radius of the capillary, r, the pressure in the bubble will be at its maximum and equation (1) can be written as (2):

$$\sigma = \Delta P_m r/2 \qquad (2)$$

where $\Delta P_m$ is the maximum difference in pressure between the inside and outside of the bubble. Beyond this maximum pressure the bubble will detach from the capillary and the process will begin again. The process of bubble formation may be controlled such that the frequency of bubble formation is changed from very a rapid frequency to a relatively slow frequency. This rate of bubble formation is related to the surface age lifetime of the air bubble in the solution. For example, the bubble frequency may be changed so that surface lifetimes from about 10 milliseconds to about 50,000 milliseconds are achieved. As a result, a plot of dynamic surface tension versus time (age of surface life) can be generated. A number of commercially available instruments are known for measuring surface tension, however, the instrument used to report dynamic surface tension values in the present invention is a Kruss BP-2 bubble tensiometer. All ink surface tension values disclosed here are reported at 24° C. to 26° C.

It will be appreciated that the surface tension values cited are reported as milliNewtons/meter (mN/m), and that 1 mN/m=1 dyne/cm. While surface tensions can be measured with high precision, surface tension values here are reported to one or two decimal places only and when values of ink surface tensions or of ink set surface tensions are reported, they are normally rounded values and not truncated values. All claims reciting surface tensions are intended to be interpreted in terms of values in mN/m normally rounded to one decimal.

It will be appreciated that the viscosity normalized surface tensions reported herein are reported in units of mN/(m*cP) and that this ratio is precisely a velocity in m/s as might be expected for a fluid uptake rate. All claims reciting ink viscosity normalized surface tensions are intended to be interpreted in terms of values in mN/(m*cP) normally rounded to one decimal.

The static surface tensions of the inks in the useful ink sets of the invention can have specific relationships in order to minimize intercolor bleed. These relationships may be as described in commonly assigned US Publication No. 2008/0207805, filed Feb. 28, 2007, the disclosure of which is incorporated by reference. In one useful embodiment employing cyan, magenta and yellow inks, the static surface tensions of the yellow ink is at least 2.0 mN/m lower than the static surface tensions of the cyan, and magenta inks of the ink set. In another useful embodiment employing cyan, magenta, yellow and black inks, the static surface tension of the yellow ink is at least 2.0 mN/m lower than the static surface tensions of the cyan, magenta and black inks of the ink set. In yet another useful embodiment employing cyan, magenta, yellow, black and colorless protective inks, the static surface tensions of the yellow ink and of the colorless protective ink are both at least 2.0 mN/m lower than the static surface tensions of the cyan, magenta and black inks of the ink set, and in a preferred embodiment, the static surface tension of the colorless protective ink is at least 1.0 mN/m lower than the static surface tension of the yellow ink. In all such embodiments, the dynamic surface tension at 10 milliseconds surface age for all inks of the ink sets may be greater than or equal to 35 mN/m as described in 60/892,176.

The inkjet inks, inkjet ink-sets and image forming methods described above may be usefully employed with any suitable inkjet image receiver known in the art. This includes, but is not limited to both matte and glossy forms of plain papers, cardstocks, cardboards, transparent or opaque plastics and vinyls, treated papers, coated papers and multilayer image receivers. Microporous glossy receivers are especially preferred as imaging media for use with the inventive inkjet inks, inkjet ink-sets, and inkjet image forming methods.

The inkjet inks of the invention can be packaged in an art known inkjet ink container or cartridge suitable for supplying ink to an ink ejector. The container can have one or more ink reservoirs each holding a distinct inventive ink. In one embodiment, intended for desktop applications, the reservoirs can individually hold up to about 20 ml of ink. In embodiments intended for commercial applications, the reservoirs can individually hold up to about 5 liters of ink.

EXAMPLES

Example I

Utility of DST Agents

Forty two colored inks were prepared according to the following formulas (percents are weight percents). All components employed, except for the pigments, were water soluble at the quantities used. Inks were characterized for particle size using a Microtrac Inc., Nanotrac Brand, Ultrafine Particle-Size Analyzer (UPA).

Cyan Ink 1 comprised: 2.2% PB15:3 pigment (dispersed using potassium oleylmethyltaurate (KOMT) similarly as described in U.S. Pat. No. 5,679,138; U.S. Pat. No. 5,651,813 or U.S. Pat. No. 5,985,017), 5.4% ethylene glycol, 7.5% glycerol, 0.75% Surfynol®-465, 1.3% TruDot® styrene-acrylate polymer (IJ4655) and 0.02% Kordek® with the balance as water. The pigment particles in this ink showed a volume weighted $50^{th}$ percentile particle size of 0.045 micron.

Magenta Ink 2 comprised: 3% PR122 pigment (dispersed using potassium oleylmethyltaurate (KOMT) similarly as described in U.S. Pat. No. 5,679,138; U.S. Pat. No. 5,651,813 or U.S. Pat. No. 5,985,017), 8% ethylene glycol, 8% glycerol, 0.5% Surfynol®-465, 1.3% TruDot® styrene-acrylate polymer (IJ4655), 0.15% triethanolamine and 0.02% Kordek® with the balance as water. The pigment particles in this ink showed a volume weighted $50^{th}$ percentile particle size of 0.016 micron.

Yellow Ink 3 comprised: 2.75% PY155 pigment (dispersed using potassium oleylmethyltaurate (KOMT) similarly as described in U.S. Pat. No. 5,679,138; U.S. Pat. No. 5,651,813 or U.S. Pat. No. 5,985,017), 5% ethylene glycol 10% glycerol, 0.5% PK90 surfactant, 1.3% TruDot® styrene-acrylate polymer (IJ4655), 0.13% triethanolamine and 0.02% Kordek® with the balance as water. The pigment particles in this ink showed a volume weighted $50^{th}$ percentile particle size of 0.010 micron. Taken together Cyan Ink 1, Magenta Ink 2 and Yellow Ink 3 form Ink set 1.

Test inks 4 through 42 (a total of thirty-nine test inks: thirteen cyan, thirteen magenta and thirteen yellow inks) were prepared by adding 1%, 2%, 3%, 4% or 5% of 1,2-hexanediol or 1%, 2%, 3%, 4% or 5% of diethyleneglycol monobutylether or 1%, 3% or 5% of triethyleneglycol monobutyl ether respectively to the above formulations.

The inks were loaded into inkjet ink cartridges suitable for supplying ink to an inkjet ink ejector.

The quality of these inks for forming smooth images on plain papers was evaluated by combining the inks into ink sets differentiated by identity and quantity of the added DST adjusting agent, i.e. ink set 1 was a control with no incorporated DST agent, ink set 2 had 1% by weight of 1,2-hexanediol in each of the cyan, magenta and yellow inks, while ink sets 3 through 6 contained cyan, magenta and yellow inks having respectively 2, 3, 4 or 5% each by weight of 1,2-hexanediol, ink sets 7 through 11 incorporated 1%, 2%, 3%, 4% or 5% by weight of diethyleneglycol monobutyl ether (Dowanol DB®) while ink sets 12 through 14 incorporated 1%, 3% or 5% by weight of triethylene glycol monobutyl ether (often supplied as polyethylene glycol monobutyl ether). These ink sets were employed to print primary color, i.e. cyan, and magenta, and secondary color, i.e. red, green and blue, color patches using a Canon Model i960 Inkjet Printer (thermal ejectors) onto five representative plain papers, namely. Georgia Pacific Inkjet Paper (20#, 90 brightness) Xerox Extra Bright hIkjet Paper (24#, 95 brightness), Hammermill Fore MP Multipurpose Paper (20#, 92 brightness), Hewlett-Packard Multipurpose Paper (20#, 92 brightness) and Hewlett-Packard Advanced Paper (20#, 92 brightness). The printed patches were visually evaluated for homogeneity using a Kodak "Grain Ruler" as described in Kodak Technical Data Publication E-58 titled "Print Grain Index" published July 2000. The graininess or mottle of each cyan, magenta, red, green and blue patch was evaluated for its Print Grain Index (PGI) following that procedure for each of the five listed plain papers. The added DST control agents enabled a lowering of the PGI for both primary colors (the cyan and magenta color patches printed alone) and secondary colors (the red, green and blue patches created by overlapping printing of two primary color patches) with higher incorporated quantity of the DST control agents enabling a greater reduction in image mottle in each and every case as evaluated by the PGI method. The mottle reduction effect was additionally observed in continuous tone images involving unequal mixtures of two or three inks to form intermediate colors, grays and blacks. The average of these twenty five PGI measurements for each ink set was tabulated and the overall change in print graininess is reported in Table I. Here negative numbers correspond to a more homogeneous and less grainy or mottled image. A difference of 4 units is readily apparent to 95% of visually average viewers. It is understood that this test methodology was employed as a matter of convenience and that ink sets formed from individual inks differing in the quantity or identity of the incorporated DST reduction agents exhibit similar excellent results.

TABLE I

| Ink set number | Inks (C M & Y) | DST agent added | Quantity | Change in Plain Paper Graininess |
|---|---|---|---|---|
| 1 | 1, 2, & 3 | none | none | check |
| 2 | 4, 5 & 6 | 1,2-hexanediol | 1% | −3 |
| 3 | 7, 8 & 9 | 1,2-hexanediol | 2% | −7 |
| 4 | 10, 11, & 12 | 1,2-hexanediol | 3% | −9 |
| 5 | 13, 14, & 15 | 1,2-hexanediol | 4% | −11 |
| 6 | 16, 17, & 18 | 1,2-hexanediol | 5% | −16 |
| 7 | 19, 20, & 21 | DEG-Bu-ether | 1% | −4 |
| 8 | 22, 23, & 24 | DEG-Bu-ether | 2% | −8 |
| 9 | 25, 26, & 27 | DEG-Bu-ether | 3% | −8 |
| 10 | 28, 29, & 30 | DEG-Bu-ether | 4% | −9 |
| 11 | 31, 32, & 33 | DEG-Bu-ether | 5% | −12 |
| 12 | 34, 35 & 36 | TEG-Bu-ether | 1% | −4 |
| 13 | 37, 38 & 39 | TEG-Bu-ether | 3% | −8 |
| 14 | 40, 41, & 42 | TEG-Bu-ether | 5% | −16 |

It is readily apparent that both the identity and quantity of the incorporated DST agent can influence the reduction in plain paper graininess. Ink sets 3 through 14 show reductions in plain paper graininess apparent to the vast majority of human observers. Ink set 2 incorporating only a low level of 1,2-hexanediol as DST agent shows only a modest reduction.

Example II

Effect of Adjusting Only Some Inks

In parallel experiments, ink sets comprising cyan, magenta and yellow inks in which only one or two inks of the three inks were modified by incorporation of the DST reduction agent were assembled and evaluated as described above. Although marked improvements in the overall graininess score were observed in some cases, the effects were uneven and deemed unacceptable because they were so dependent on the color being reproduced. For example, incorporation of an effective level of the DST adjustment agent in only a magenta ink results in significant reduction in magenta patch graininess, moderate reduction in red and blue patch graininess and no reduction in cyan, yellow or green patch graininess. This is readily understandable in that the DST adjustment agent operates only on colors derived from the incorporating inks so that even and visually pleasing graininess reduction for full color images requires that the DST reduction agent be present in the three primary color forming inks, cyan, magenta and yellow.

Example III

Effect of DST Reduction Agent on Ink Physical Properties and Jetting

By way of illustration, the Viscosities, Static Surface Tensions, Surface Tensions at 0.01 s surface age, Viscosity normalized 0.01 s surface age surface tensions and firing frequency limit for several of the magenta inks from the above Example I are reported below in Table II. This table illustrates that directly adding DST agent to an ink can increase the ink viscosity while simultaneously decreasing both the ink static surface tension and the ink surface tension at 0.01 s surface age and that the effects are dependent on the identity of the DST agent employed. This table additionally illustrates that excessive levels of DST agent can interfere with adequate firing of the ink from a thermal ejector as indicated by reduced maximum firing frequency limits, which leads to poor printing speed and page throughput.

TABLE II

| Ink number | DST agent added | Pct. | Ink Viscosity (in cP * s) | Ink Static Surface Tension (in mN/m) | Ink Surface Tension at 0.01 s (in mN/m) | Viscosity Normalized 0.01 s ST (in mN/m * cP) | Firing Frequency Limit |
|---|---|---|---|---|---|---|---|
| 2 | none | none | 1.80 | 36.5 | 44.3 | 24.6 | >25 kHz |
| 5 | 1,2-hexanediol | 1% | 1.93 | 36.2 | 41.9 | 21.7 | >25 kHz |
| 8 | 1,2-hexanediol | 2% | 2.07 | 35.2 | 38.8 | 18.7 | ~22 kHz |
| 11 | 1,2-hexanediol | 3% | 2.15 | 34.3 | 36.8 | 17.1 | ~20 kHz |
| 14 | 1,2-hexanediol | 4% | 2.21 | 33.3 | 34.9 | 15.8 | ~20 kHz |
| 17 | 1,2-hexanediol | 5% | 2.53 | 31.5 | 32.0 | 12.7 | ~16 kHz |
| 35 | TEG-Bu-ether | 1% | 1.87 | 36.3 | 42.8 | 22.9 | ND |
| 38 | TEG-Bu-ether | 3% | 2.03 | 36.1 | 42.7 | 21.0 | ND |
| 41 | TEG-Bu-ether | 5% | 2.25 | 35.8 | 39.6 | 17.6 | ND |

Example IV

Ink Set Physical Properties and Visual Results

The Viscosity Normalized 0.01 s surface tensions of the individual inks in ink sets 1 through 6 above along with the ink set average viscosity normalized 0.01 s surface tensions and the change in plain paper graininess, all as determined following the above procedures are compiled in Table III below. As is apparent, a useful reduction in plain paper graininess is, i.e. a reduction in graininess by at least 4 grain units, is achieved only when the individual cyan, magenta and yellow inks in the ink set each exhibit a viscosity normalized 0.01 s surface tension of less than about 23 mN/(m*cP) and the average viscosity normalized 0.01 s surface tension for the three inks taken together is less about 22 mN/(m*cP). These conditions together assure visual improvement in all primary, secondary and mixed colors.

TABLE III

| Ink set number | Cyan Ink Viscosity Normalized 0.01 s ST (in mN/m * cP) | Magenta Ink Viscosity Normalized 0.01 s ST (in mN/m * cP) | Yellow Ink Viscosity Normalized 0.01 s ST (in mN/m * cP) | Ink set Average Viscosity Normalized 0.01 s ST (in mN/m * cP) | Change in Plain Paper Graininess |
|---|---|---|---|---|---|
| 1 | 26.0 | 24.6 | 26.7 | 25.8 | check |
| 2 | 23.4 | 21.7 | 24.8 | 23.3 | −3 |
| 3 | 21.3 | 18.7 | 22.4 | 20.8 | −7 |
| 4 | 19.3 | 17.1 | 20.3 | 18.9 | −9 |
| 5 | 17.9 | 15.8 | 18.3 | 17.3 | −11 |
| 6 | 16.0 | 12.7 | 15.8 | 14.8 | −16 |

TABLE IV

| Ink number | Pigment employed | 50% percentile particle size in ink | 20 deg Gloss on Glossy Medium |
|---|---|---|---|
| 101 | PB15:3 | 165 | 3.6 |
| 102 | " | 134 | 6.2 |
| 103 | " | 87 | 43.1 |
| 104 | " | 32 | 64.4 |
| 105 | " | 31 | 65.9 |
| 106 | " | 31 | 62.4 |
| 107 | PR122 | 118 | 11.1 |
| 108 | " | 102 | 52.9 |
| 109 | " | 17 | 98.9 |
| 110 | " | 18 | 98.1 |
| 111 | " | 12 | 110 |
| 112 | " | 12 | 109 |
| 113 | PY155 | 199 | 9.7 |
| 114 | " | 14 | 70.9 |
| 115 | " | 11 | 89.2 |
| 116 | " | 9 | 107 |
| 117 | " | 9 | 112 |
| 118 | " | 9 | 109 |

Example V

Particle Size Effects

Control Inks like those from the above ink sets were modified by replacing the individual cyan, magenta or yellow pigment dispersions with corresponding pigment dispersions that had been ground to distinct particle sizes to form inks 101 through 118. These inks were individually printed onto Kodak Glossy Medium and the 20 deg gloss measured using a Glossometer. Higher Gloss readings correspond to a more reflective image reminiscent of traditional photographic images. The volume weighed 50$^{th}$ percentile particle size of the pigments in the test inks and the printed Gloss results are reported in Table IV below. It is readily apparent that high levels of gloss on glossy media are only obtained when using smaller sized pigments.

Example VI

Determination of Properties of Useful Ink sets

A range of comparative and inventive inkjet inks and inkjet ink sets including cyan, magenta, and yellow inks intended to distinguish fully between the influences of ink viscosity modification taken alone, the influence of ink surface tension at 0.01 s surface age modification taken alone and the combined influences on plain paper graininess and photo-glossy paper performance, were prepared as follows:

Comparative Cyan Ink 201 (prior art viscosity and 0.01 s surface tension, no DST agent) comprised: 2.2% PB15:3 pigment (dispersed using potassium oleylmethyltaurate (KOMT) similarly as described in U.S. Pat. No. 5,679,138; U.S. Pat. No. 5,651,813 or U.S. Pat. No. 5,985,017), 7.5% glycerol, 4.5% ethyleneglycol; 0.75% Surfynol-465®, 0.9% of a benzylmethacrylate-acrylic acid co-polymer at weight ratio 77:23 with acid number ~137, 1.2% of a polycarbonate-polyurethane with acid number 76 and Mw ~26,000 Daltons and 0.02% Kordek® anti-bacterial, 0.05% Triethanolamine as buffer, with the balance as water. The pigment particles in this ink showed a volume weighted $50^{th}$ percentile particle size of 0.060 micron.

Comparative Magenta Ink 202 (prior art viscosity and 0.01 s surface tension, no DST agent) comprised: 3% PR122 pigment (dispersed using potassium oleylmethyltaurate (KOMT) similarly as described in U.S. Pat. No. 5,679,138; U.S. Pat. No. 5,651,813 or U.S. Pat. No. 5,985,017), 8% glycerol, 5.0% ethyleneglycol; 0.50% Surfynol®-465, 0.9% of a benzylmethacrylate-acrylic acid co-polymer at weight ratio 77:23 with acid number ~137, 1.2% of a polycarbonate-polyurethane with acid number 76 and Mw ~26,000 Daltons and 0.02% Kordek® anti-bacterial, 0.05% Triethanolamine as buffer, with the balance as water. The pigment particles in this ink showed a volume weighted $50^{th}$ percentile particle size of 0.013 micron.

Comparative Yellow Ink 203 (prior art viscosity and 0.01 s surface tension, no DST agent) comprised: 2.75% PY155 pigment (dispersed using potassium oleylmethyltaurate (KOMT) similarly as described in U.S. Pat. No. 5,679,138; U.S. Pat. No. 5,651,813 or U.S. Pat. No. 5,985,017), 10% glycerol, 2.0% ethyleneglycol; 0.75% Tergitol® 15s5 surfactant, 1.5% of a benzylmethacrylate-acrylic acid co-polymer at weight ratio 77:23 with acid number ~137, 1.60% of a polycarbonate-polyurethane with acid number 76 and Mw ~26,000 Daltons and 0.02% Kordek® anti-bacterial with the balance as water. The pigment particles in this ink showed a volume weighted $50^{th}$ percentile particle size of 0.009 micron.

Comparative Inks 201 (Cyan), 202 (Magenta) and 203 (Yellow) taken together form comparative ink set 20.

Inventive Cyan Ink 211 (increased viscosity and DST agent adjusted 0.01 s surface tension) comprised: 2.2% PB15:3 pigment (dispersed using potassium oleylmethyltaurate (KOMT) similarly as described in U.S. Pat. No. 5,679,138; U.S. Pat. No. 5,651,813 or U.S. Pat. No. 5,985,017), 4.5% glycerol, 4.5% 1,5-pentanediol; 2% triethylene glycol, 4% 1,2-pentanediol; 1.0% Surfynol®-465, 1.1% of a benzylmethacrylate-acrylic acid co-polymer at weight ratio 77:23 with acid number ~137, 0.9% of a polycarbonate-polyurethane with acid number 76 and Mw ~26,000 Daltons and 0.02% Kordek® anti-bacterial, 0.05% Triethanolamine as buffer, with the balance as water. The pigment particles in this ink showed a volume weighted $50^{th}$ percentile particle size of 0.060 micron.

Inventive Magenta Ink 212 (increased viscosity and DST agent adjusted 0.01 s surface tension) comprised: 3% PR122 pigment (dispersed using potassium oleylmethyltaurate (KOMT) similarly as described in U.S. Pat. No. 5,679,138; U.S. Pat. No. 5,651,813 or U.S. Pat. No. 5,985,017), 5.5% glycerol, 5.5% 1,5-pentanediol; 4.0% triethyleneglycol, 3.0% 1,2-pentanediol; 0.75% Surfynol®-465, 1.2% of a benzylmethacrylate-acrylic acid co-polymer at weight ratio 77:33 with acid number ~137, 1.0% of a polycarbonate-polyurethane with acid number 76 and Mw ~26,000 Daltons and 0.02% Kordek® anti-bacterial, 0.05% Triethanolamine as buffer, with the balance as water. The pigment particles in this ink showed a volume weighted $50^{th}$ percentile particle size of 0.013 micron.

Inventive Yellow Ink 213 (increased viscosity and DST agent adjusted 0.01 s surface tension) comprised: 2.75% PY155 pigment (dispersed using potassium oleylmethyltaurate (KOMT) similarly as described in U.S. Pat. No. 5,679,138; U.S. Pat. No. 5,651,813 or U.S. Pat. No. 5,985,017), 7.0% glycerol, 4.0% 1,5-pentanediol; 3% 1,2-pentanediol; 0.5% Tergitol® 15s5 surfactant, 0.9% of a benzylmethacrylate-acrylic acid co-polymer at weight ratio 77:23 with acid number ~137, 1.2% of a polycarbonate-polyurethane with acid number 76 and Mw ~26,000 Daltons and 0.02% Kordek® anti-bacterial with the balance as water. The pigment particles in this ink showed a volume weighted $50^{th}$ percentile particle size of 0.009 micron.

Inventive Inks 211 (Cyan), 212 (Magenta) and 213 (Yellow) taken together form inventive ink set 21.

Experimental Cyan Ink 221 (increased viscosity with no change in 0.01 s surface tension) comprised: 2.2% PB15:3 pigment (dispersed using potassium oleylmethyltaurate (KOMT) similarly as described in U.S. Pat. No. 5,679,138; U.S. Pat. No. 5,651,813 or U.S. Pat. No. 5,985,017), 6.0% glycerol, 6.0% 1,5-pentanediol; 2% triethylene glycol, 1.0% Surfynol® 465, 1.1% of a benzylmethacrylate-acrylic acid co-polymer at weight ratio 77:23 with acid number ~137, 0.9% of a polycarbonate-polyarethane with acid number 76 and Mw ~26,000 and 0.02% Kordek® anti-bacterial, 0.05% triethanolamine as buffer, with the balance as water. The pigment particles in this ink showed a volume weighted $50^{th}$ percentile particle size of 0.060 micron.

Experimental Magenta Ink 222 (increased viscosity with no change in 0.01 s surface tension) comprised: 3% PR122 pigment (dispersed using potassium oleylmethyltaurate (KOMT) similarly as described in U.S. Pat. No. 5,679,138; U.S. Pat. No. 5,651,813 or U.S. Pat. No. 5,985,017), 6.8% glycerol, 6.8% 1,5-pentanediol; 4.0% triethyleneglycol, 0.75% Surfynol® 465, 1.2% of a benzylmethacrylate-acrylic acid co-polymer at weight ratio 77:33 with acid number ~137, 1.0% of a polycarbonate-polyurethane with acid number 76 and Mw ~26,000 Daltons and 0.02% Kordek® anti-bacterial, 0.05% Triethanolamine as buffer, with the balance as water. The pigment particles in this ink showed a volume weighted $50^{th}$ percentile particle size of 0.013 micron.

Experimental Yellow Ink 223 (increased viscosity with no change in 0.01 s surface tension) comprised: 2.75% PY155 pigment (dispersed using potassium oleylmethyltaurate (KOMT) similarly as described in U.S. Pat. No. 5,679,138; U.S. Pat. No. 5,651,813 or U.S. Pat. No. 5,985,017), 8.3% glycerol, 5.3% 1,5-pentanediol; 0.5% Tergitol® 15s5 surfactant, 0.9% of a benzylmethacrylate-actylic acid co-polymer at weight ratio 77:23 with acid number ~137, 1.2% of a polycarbonate-polyurethane with acid number 76 and Mw ~26,000 Daltons and 0.02% Kordek® anti-bacterial with the balance as water. The pigment particles in this ink showed a volume weighted $50^{th}$ percentile particle size of 0.009 micron.

Experimental Inks 221 (Cyan), 222 (Magenta) and 223 (Yellow) taken together form Experimental ink set 22.

Experimental Cyan Ink 231 (unchanged viscosity and DST agent adjusted 0.01 s surface tension) comprised: 2.2% PB115:3 pigment (dispersed using potassium oleylmethyltaurate (KOMT) similarly as described in U.S. Pat. No. 5,679, 138; U.S. Pat. No. 5,651,813 or U.S. Pat. No. 5,985,017), 6.1% glycerol, 4.0% 1,2-pentanediol; 1.0% Surfynol-465, 1.1% of a benzylmethacrylate-acrylic acid co-polymer at weight ratio 77:23 with acid number ~137, 0.9% of a polycarbonate-polyurethane with acid number 76 and Mw ~26,000 and 0.02% Kordek anti-bacterial, 0.05% Triethanolamine as buffer, with the balance as water. The pigment particles in this ink showed a volume weighted $50^{th}$ percentile particle size of 0.060 micron.

Experimental Magenta Ink 232 (unchanged viscosity and DST agent adjusted 0.01 s surface tension) comprised: 3% PR122 pigment (dispersed using potassium oleylmethyltaurate (KOMT) similarly as described in U.S. Pat. No. 5,679,138; U.S. Pat. No. 5,651,813 or U.S. Pat. No. 5,985,017), 7.6% glycerol, 3.0% 1,2-pentanediol; 0.75% Surfynol®-465, 1.2% of a benzylmethacrylate-acrylic acid co-polymer at weight ratio 77:33 with acid number ~137, 1.0% of a polycarbonate-polyurethane with acid number 76 and Mw ~26,000 Daltons and 0.02% Kordek® anti-bacterial, 0.05% Triethanolamine as buffer, with the balance as water. The pigment particles in this ink showed a volume weighted $50^{th}$ percentile particle size of 0.013 micron.

Experimental Yellow Ink 233 (unchanged viscosity and DST agent adjusted 0.01 s surface tension) comprised: 2.75% PY155 pigment (dispersed using potassium oleylmethyltaurate (KOMT) similarly as described in U.S. Pat. No. 5,679,138; U.S. Pat. No. 5,651,813 or U.S. Pat. No. 5,985,017), 7.4% glycerol, 3.0% 1,2-pentanediol; 0.5% Tergitol® 15s5 surfactant, 0.9% of a benzylmethacrylate-acrylic acid co-polymer at weight ratio 77:23 with acid number ~137, 1.2% of a polycarbonate-polyurethane with acid number 76 and Mw ~26,000 Daltons and 0.02% Kordek® anti-bacterial with the balance as water. The pigment particles in this ink showed a volume weighted $50^{th}$ percentile particle size of 0.009 micron.

Experimental Inks 231 (Cyan), 232 (Magenta) and 233 (Yellow) taken together form Experimental ink set 23.

It will be appreciated that these four ink sets delineate the corners of an experimental design with relative high and low values of ink and ink set viscosity and 0.01 s surface tension as outlined in Table V below:

TABLE V

| Ink set | Viscosity | 0.01 s Surface tension |
| --- | --- | --- |
| Comparative 20 | low | high (no DST) |
| Inventive 21 | high | low |
| Experimental 22 | high | high (no DST) |
| Experimental 23 | low | low |

It will be further appreciated that additional experimental inks suitable for experimental evaluation of intermediate positions within this experimental design can be readily prepared by blending individual corner inks. As exemplars, a cyan ink of high viscosity and intermediate 0.01 s surface tension is readily available from a 1:1 mixture of cyan ink 211 and cyan ink 221, likewise a magenta ink of intermediate viscosity and intermediate surface tension is readily available from a 1:1 mixture of magenta ink 222 and magenta ink 232. More complex mixtures of similar colored inks from the four corners of the design allow attainment of inks with many of the intermediate compositions and many of the intermediate viscosity and 0.01 s surface tension properties. In a similar vein, ink sets probing the experimentally defined space an be assembled using either the "corner" inks or various intermediate blended inks. In this way, the space defined by the inks of ink sets 20, 21, 22 and 23 was experimentally probed. Significant physical properties of corner inks and blended inks were measured and other properties of some of the intermediate inks calculated by interpolation. The various inks were assembled into ink set spanning the design range, loaded into ink set cartridges and a collection of image quality targets printed using these various ink sets on a suite of plain papers and photo-glossy media using a Kodak Model 5300 Desktop Printer. The resultant images were evaluated by a judging committee for Image Quality with emphasis on plain paper graininess, plain paper intercolor bleed, plain paper coalescence, glossy media inter-color bleed, glossy media gloss and glossy media coalescence. All of the ink sets performed well for intercolor bleed. The ink set identities, physical properties and the judging results are listed in Table VI below.

TABLE VI

| Inks | Cyan Ink Viscosity Normalized 0.01 s ST (in mN/m * cP) | Magenta Ink Viscosity Normalized 0.01 s ST (in mN/m * cP) | Yellow Ink Viscosity Normalized 0.01 s ST (in mN/m * cP) | Ink set Average Viscosity Normalized 0.01 s ST (in mN/m * cP) | Plain Paper Graininess | Coalescence | Glossy Media Gloss |
| --- | --- | --- | --- | --- | --- | --- | --- |
| Ink set 20 | 24.9 | 24.3 | 24.5 | 24.6 | poor | Good | OK |
| Ink set 21 | 17.9 | 15.6 | 19.7 | 17.7 | Excellent | OK | Good |
| Ink set 22 | 20.7 | 17.9 | 23.6 | 20.7 | poor | OK | OK |
| Ink set 23 | 22.0 | 21.2 | 21.5 | 21.6 | OK | OK | Good |
| Blended 1 | 19.2 | 16.7 | 21.6 | 19.2 | Excellent | OK | Good |
| Blended 2 | 22.0 | 19.5 | 22.4 | 21.3 | OK | OK | Good |
| Blended 3 | 18.1 | 15.8 | 20.5 | 18.1 | Excellent | OK | Good |
| Blended 4 | 19.4 | 17.2 | 20.9 | 19.2 | Excellent | OK | Good |

Adequate improvements were observed when the individual cyan, magenta and yellow inks in the evaluated ink set all exhibited a 0.01 s viscosity normalized surface tension of less that 23 mN/(m*cP) and the average 0.01 s viscosity normalized surface tension over the three inks was less than 22 mN/(m*cP) while excellent improvements were observed when the individual cyan, magenta and yellow inks in the evaluated ink set all exhibited a 0.01 s viscosity normalized surface tension of less that 22 mN/(m*cP) and the average 0.01 s viscosity normalized surface tension over the three inks was less than 21 mN/(m*cP).

Example VII

Limits on ink Viscosity and Viscosity Normalized 0.01 s ST

Inventive Cyan Ink 401 comprised: 2.2% PB15:3 pigment (dispersed using potassium oleylmethyltaurate (KOMT) similarly as described in U.S. Pat. No. 5,679,138; U.S. Pat. No. 5,651,813 or U.S. Pat. No. 5,985,017), 7.0% glycerol, 5% 1,5-pentanediol; 3.0% 1,2-pentanediol; 1.0% Surfynol-465®, 1.3% of a benzylmethacrylate-acrylic acid co-polymer at weight ratio 67:33 with acid number ~200, 1.2% of a polycarbonate-polyurethane with acid number 76 and Mw ~26,000 Daltons and 0.02% Kordek® anti-bacterial with the balance as water. The pigment particles in this ink showed a volume weighted $50^{th}$ percentile particle size of 0.060 micron. This ink exhibited a static surface tension 35.3 mN/m, a viscosity of 2.10 cP, a 0.01 s surface tension of 38.1 mN/m and a viscosity normalized 0.01 s surface tension of 18.1 mN/(cP*m).

Inventive Magenta Ink 402 comprised: 3% PR122 pigment (dispersed using potassium oleylmethyltaurate (KOMT) similarly as described in U.S. Pat. No. 5,679,138; U.S. Pat. No. 5,651,813 or U.S. Pat. No. 5,985,017), 6.5% glycerol, 6.5% 1,5-pentanediol; 2% triethyleneglycol, 2.25% 1,2-pentanediol; 0.75% Surfynol®-465, 1% of a benzylmethacrylate-acrylic acid co-polymer at weight ratio 67:33 with acid number ~200, 1.2% of a polycarbonate-polyurethane with acid number 76 and Mw ~26,000 Daltons and 0.02% Kordek® anti-bacterial with the balance as water. The pigment particles in this ink showed a volume weighted $50^{th}$ percentile particle size of 0.013 micron. This ink exhibited a static surface tension 36.4 mN/m, a viscosity of 2.58 cP, a 0.01 s surface tension of 40.8 mN/m and a viscosity normalized 0.01 s surface tension of 15.8 mN/(cP*m).

Inventive Yellow Ink 403 comprised: 2.75% PY155 pigment (dispersed using potassium oleylmethyltaurate (KOMT) similarly as described in U.S. Pat. No. 5,679,138; U.S. Pat. No. 5,651,813 or U.S. Pat. No. 5,985,017), 7.33% glycerol, 4.33% 1,5-pentanediol; 2.25% 1,2-pentanediol; 0.5% Tergitol® 15s5 surfactant, 0.9% of a benzylmethacrylate-acrylic acid co-polymer at weight ratio 67:33 with acid number ~200, 1.2% of a polycarbonate-polyurethane with acid number 76 and Mw ~26,000 Daltons and 0.02% Kordek® anti-bacterial with the balance as water. The pigment particles in this ink showed a volume weighted $50^{th}$ percentile particle size of 0.009 micron. This ink exhibited a static surface tension 32.5 mN/m, a viscosity of 2.04 cP, a 0.01 s surface tension of 41.8 mN/m and a viscosity normalized 0.01 s surface tension of 20.5 mN/(cP*m).

PhotoBlack Ink 404 comprised 1.63% of PK-7 carbon black, 0.38% of PB15:3 pigment and 0.5% of PR122 pigment each individually dispersed using potassium oleylmethyltaurate (KOMT) similarly as described in U.S. Pat. No. 5,679,138; U.S. Pat. No. 5,651,813 or U.S. Pat. No. 5,985,017, 7.0% glycerol, 4.0% 1,5-pentanediol; 4.0% triethyleneglycol, 0.45% Strodex® PK-90, 0.9% of a benzylmethacrylate-acrylic acid co-polymer at weight ratio 67:33 with acid number ~200, 1.2% of a polycarbonate-polyurethane with acid number 76 and Mw ~26,000 Daltons, 0.3% triethanolamine and 0.02% Kordek® anti-bacterial with the balance as water. This ink exhibited a static surface tension 35.2 mN/m, a viscosity of 1.97 cP, a 0.01 s surface tension of 44.7 mN/m and a viscosity normalized 0.01 s surface tension b of 22.7 mN/(cP*m).

Inkjet inks 401(Cyan), 402(Magenta), 403(Yellow) and 404(Photoblack) together form inventive inkjet ink set 40.

Cyan inkjet inks 401a through 401e, magenta inkjet inks 402a through 402e, yellow inkjet inks 403a through 403e and photoblack inkjet inks 404a through 404e were prepared analogously to inks 401 through 404 by adjusting the viscosity to higher values by increasing the humectant content. The viscosities and viscosity normalized 0.01 s surface tensions of these inks are reported in Table VII below. Inkjet inks 401a (Cyan), 402a(Magenta), 403a(Yellow) and 404a(Photoblack) together form inventive inkjet ink set 40a. Inkjet inks 401b(Cyan), 402b(Magenta), 403b(Yellow) and 404b(Photoblack) together form inventive inkjet ink set 40b. Inkjet inks 401c(Cyan), 402c(Magenta), 403c(Yellow) and 404c(Photoblack) together form inventive inkjet ink set 40c. Inkjet inks 401d(Cyan), 402d(Magenta), 403d(Yellow) and 404d(Photoblack) together form inventive inkjet ink set 40d. Inkjet inks 401e(Cyan), 402e(Magenta), 403e(Yellow) and 404e(Photoblack) together form inventive inkjet ink set 40e. These inkjet ink set were evaluated as described above for image quality on both photo-glossy papers and plain papers. Results are listed in Table VII below.

TABLE VII

| Inks | Cyan Ink Viscosity (in cP) and Viscosity Normalized 0.01 s ST (in mN/m * cP) | Magenta Ink Viscosity (in cP) and Viscosity Normalized 0.01 s ST (in mN/m * cP)) | Yellow Ink Viscosity (in cP) and Viscosity Normalized 0.01 s ST (in mN/m * cP) | Ink set Average Viscosity (in cP) and Viscosity Normalized 0.01 s ST (in mN/m * cP) | Plain Paper Graininess | Glossy Media Coalescence |
|---|---|---|---|---|---|---|
| Ink set 40 | 2.10, 18.1 | 2.58, 15.8 | 2.04, 21.3 | 2.24, 18.4 | Excellent | Excellent |
| Ink set 40a | 2.47, 15.4 | 2.90, 14.1 | 2.32, 18.0 | 2.56, 15.8 | Excellent | Excellent |
| Ink set 40b | 2.91, 13.1 | 3.28, 12.1 | 2.72, 15.4 | 3.00, 13.5 | Excellent | Good |

TABLE VII-continued

| Inks | Cyan Ink Viscosity (in cP) and Viscosity Normalized 0.01 s ST (in mN/m * cP) | Magenta Ink Viscosity (in cP) and Viscosity Normalized 0.01 s ST (in mN/m * cP)) | Yellow Ink Viscosity (in cP) and Viscosity Normalized 0.01 s ST (in mN/m * cP) | Ink set Average Viscosity (in cP) and Viscosity Normalized 0.01 s ST (in mN/m * cP) | Plain Paper Graininess | Glossy Media Coalescence |
|---|---|---|---|---|---|---|
| Ink set 40c | 3.18, 12.0 | 3.69, 11.1 | 2.99, 14.0 | 3.29, 12.4 | Excellent | Fair |
| Ink set 40d | 3.48, 10.9 | 4.02, 10.1 | 3.29, 12.7 | 3.60, 11.2 | Excellent | Poor |
| Ink set 40e | 3.76, 10.1 | 4.33, 9.4 | 3.56, 11.7 | 3.88, 10.4 | Excellent | Poorer |

As is readily apparent, increasing the viscosity or decreasing the viscosity normalized 0.01 s surface tension of the inks in an ink set leads to increasing colorant coalescence when images are printed on photo-glossy media using these ink sets. It is apparent that maintaining individual inkjet ink viscosities below 4.0 cP and inkjet ink set average viscosities below 3.6 cP is preferred, that maintaining individual inkjet ink viscosities below 3.7 cP and inkjet ink set average viscosities below 3.2 cP is more preferred, that maintaining individual inkjet ink viscosities below 3.3 cP and inkjet ink set average viscosities below 3.1 cP is even more preferred and that maintaining individual inkjet ink viscosities below 3.0 cP and inkjet ink set average viscosities below 2.9 cP is most preferred. Likewise it is apparent that maintaining individual inkjet ink Viscosity Normalized 0.01 s ST above 10.5 mN/m*cP and inkjet ink set average Viscosity Normalized 0.01 s ST above 11.5 mN/m*cP is preferred, that maintaining individual inkjet ink Viscosity Normalized 0.01 s ST above 11.5 mN/m*cP and inkjet ink set average Viscosity Normalized 0.01 s ST above 12.5 mN/m*cP is more preferred, that maintaining individual inkjet ink Viscosity Normalized 0.01 s ST above 12.5 mN/m*cP and inkjet ink set average Viscosity Normalized 0.01 s ST above 14.0 mN/m*cP is even more preferred.

Example VIII

Gloss Improvement on Adding DST Agent to Protective Ink or PhotoBlack Ink

Text Black Ink 505 comprised 4.5% of Orient 351 self dispersed carbon, 0.4% of benzylmethacrylate-acrylic acid co-polymer, 12% glycerol, 0.4% Tergitol® 15s12 surfactant; 0.23% of triethanolamine and 0.02% of Kordek® anti-bacterial with the balance as water.

Clear Ink 506 comprised 0.8% of a benzylmethacrylate-acrylic acid co-polymer at weight ratio 67:33 with acid number ~200, 1.2% of a polycarbonate-polyurethane with acid number 76 and Mw ~26,000 Daltons, 12.0% glycerol, 6.0% ethylene glycol, 0.75% Tergito®15-s-5 and 0.02% Kordek MLX® as antibacterial.

Clear Ink 507 was like Clear Ink 506 except for the addition of 2% of 1,2-pentanediol as a 0.01 s surface tension reducing agent. Clear ink 507 exhibited a 0.01 s viscosity normalized surface tension of 20.3 mN/(cP*m).

Inkjet Ink set 50 comprising inks 401, 402, 403, 404, 505 and 506 was assembled and loaded into cartridges. Comparative Inkjet Ink set 20a comprising inks 201, 202, 203, 404, 505 and 506 was assembled and loaded into cartridges. The cartridges containing Comparative Inkjet Ink set 20a and Inventive Inkjet Ink set 50 were sequentially loaded into a Kodak Model 5300 InkJet Printer and a 7 patch gloss target set was printed using each ink set on Kodak Photo-Glossy Medium using a print-mode that employs only the Cyan, Magenta and Yellow Inks of each ink set. The comparative inkjet ink set showed an average 20° Gloss of 33.6, while the Inventive inkjet ink set showed an average 20° gloss of 51.5, a 53% improvement. Additional print modes on a variety of commercially useful photo-glossy papers showed like improvements in measured gloss.

In a separate experiment, ink set 50 was compared to ink set 50a which comprised inks 401, 402, 403, 404, 505 and 507, i.e. the ink set with 1,2-pentanediol in the clear ink. When both ink sets were individually printed onto photo-glossy media using a Kodak Model 5300 InkJet Printer using a print-mode that specifically employs the clear ink in unprinted and light color areas, ink set 50a showed a marked increase in gloss of the light colors thus demonstrating the utility of controlling the 0.01 s surface tension of the protective ink in the inkjet ink set and again demonstrating the utility of 0.01 s surface tension reduction in the inkjet art.

In a separate experiment, photoblack ink 404 was modified by incorporation of 3% of 1,2-pentanediol to form photoblack ink 508. Inkjet ink set 50c was assembled using inks 401, 402, 403, 508, 505 and 507. When evaluated, this inkjet ink set also showed excellent plain paper graininess and high photo-glossy paper gloss without coalescence.

The invention has been described in detail with particular reference to certain preferred embodiments thereof, but it will be understood that variations and modifications can be effected within the spirit and scope of the invention.

The invention claimed is:

1. An inkjet ink set comprising a cyan ink, a magenta ink and a yellow ink, wherein each of said cyan, magenta and yellow inks individually comprises at least 70% water, between 1% and 5% by weight of a dispersed pigment colorant, a surfactant that reduces static surface tension to the range of 28 to 40 mN/m, a dynamic surface tension reducing agent distinct from the surfactant, and at least one humectant distinct from the surfactant and the dynamic surface tension reducing agent; wherein the humectant and dynamic surface tension agent together comprise between 8% and 20% by weight of each ink; wherein said surfactant, said dynamic surface tension reducing agent and said humectant can be the same or different between said cyan, magenta and yellow inks; wherein at least one of said inks further comprises a polyurethane binder polymer; and wherein each of said cyan, magenta and yellow inks is characterized by exhibiting a viscosity between 1.5 and 3.0 cP, a static surface tension between 28 and 40 mN/m, and a viscosity normalized dynamic surface tension at surface refresh ages of 0.01 s of less than 23.0 mN/(m*cP); and wherein the average viscosity normalized dynamic surface tension at a surface refresh age of 0.01 s for said cyan, magenta and yellow inks taken together is less than 22.0 mN/(m*cP).

2. The ink set of claim 1 wherein each of said cyan, magenta and yellow pigment colorants has a volume weighed $50^{th}$ percentile particle size of between 1 and 85 nm.

3. The ink set of claim 2 further comprising at least one ancillary ink chosen from a photoblack ink, a text-black ink, a clear ink, a light cyan ink, a light magenta ink, an orange ink, a green ink, a white ink, a red ink, a violet ink, a blue ink, and a brown ink.

4. The ink set of claim 1 wherein for at least one ink of said ink set said dispersed pigment colorant is a surfactant dispersed pigment dispersed with a potassium salt of oleylmethyltaurate.

5. The ink set of claim 1 wherein for at least one ink of said ink set said dispersed pigment colorant is a self-dispersed pigment colorant or a polymeric dispersed pigment colorant.

6. The ink set of claim 1 wherein each of said cyan, magenta and yellow ink further comprises a polyurethane binder polymer.

7. The ink set of claim 6 wherein at least one ink of said ink set further comprises a benzylmethacrylate-acrylic acid copolymer.

8. The ink set of claim 1 further comprising at least one ancillary ink chosen from a photoblack ink, a text-black ink, a clear ink, a light cyan ink, a light magenta ink, an orange ink, a green ink, a white ink, a red ink, a violet ink, a blue ink, and a brown ink.

9. The inkjet ink set of claim 8 wherein at least one ancillary ink comprises a dynamic surface tension reducing agent.

10. The ink set of claim 1, wherein the dynamic surface tension reducing agents for each of the cyan, magenta and yellow inks comprise an asymmetric polyhydric alcohol or a mono-alkyl ether derived from a polyhydric alcohol.

11. The ink set of claim 10, wherein the dynamic surface tension reducing agents for each of the cyan, magenta and yellow inks comprise ethylene glycol monomethyl ether, ethylene glycol monobutyl ether, ethylene glycol monoethyl ether acetate, diethylene glycol monomethyl ether, diethylene glycol monobutyl ether, triethylene glycol monobutyl ether, polyethylene glycol monobutyl ether, propylene glycol monopropyl ether, diethylene glycol monobutyl ether acetate, 1,2-butanediol, 1,2-pentanediol, 1,2-hexanediol, 1-phenyl-1, 2-ethanediol, 1,2,6-hexanetriol, 1,2-heptanediol, 1,2-octanediol, or 1,3-hexanediol.

12. The ink set of claim 10, wherein said dynamic surface tension reducing agent for each of the cyan, magenta and yellow inks has a molecular weight of between 76 and 350 Daltons and a flash point of more than 96° C.

13. The ink set of claim 1, wherein said dynamic surface tension reducing agent for each of the cyan, magenta and yellow inks has a molecular weight of between 90 and 350 Daltons and a flash point of more than 96° C.

14. The inkjet ink set of claim 1 wherein each of said cyan, magenta and yellow inks exhibits a 0.01 s surface age surface tension of less than 43 mN/m.

15. The inkjet ink set of claim 1 wherein each of said cyan, magenta and yellow ink is further characterized by exhibiting a viscosity normalized dynamic surface tension at surface refresh ages of 0.01 s of more than 12.5 mN/(m*cP); and the average viscosity normalized dynamic surface tension at a surface refresh age of 0.01 s for said cyan, magenta and yellow inks taken together is more than 14.0 mN/(m*cP).

16. The ink set of claim 15, wherein the viscosity of each of said cyan, magenta and yellow inks is less than 3.0 cP; and wherein the average viscosity of said cyan, magenta and yellow inks taken together is less than 2.9 cP.

17. An inkjet recording method comprising applying an ink set according to claim 1 to a recording medium by thermal, stream or piezo ejection.

18. An inkjet recording method of claim 17, comprising the steps of:
 a) providing a thermal, stream or piezo inkjet printer that is responsive to digital data signals;
 b) loading said printer with an inkjet recording element;
 c) loading said printer with an inkjet ink set according to claim 1, and
 d) printing a color image on said inkjet recording element using said inkjet ink set in response to said digital signals.

19. The inkjet recording method according to claim 18, wherein the printer comprises a thermal print head.

* * * * *